(12) United States Patent
Sasaki et al.

(10) Patent No.: US 9,021,289 B2
(45) Date of Patent: Apr. 28, 2015

(54) METHOD AND SYSTEM FOR POWER ESTIMATION BASED ON A NUMBER OF SIGNAL CHANGES

(75) Inventors: Takayuki Sasaki, Kawasaki (JP); Hirohisa Kotegawa, Yokohama (JP); Takashi Tokue, Yokohama (JP); Shigeru Satoh, Yokohama (JP); Tatsuro Miyakawa, Yokohama (JP); Ryuji Fujita, Kawasaki (JP); Junichi Niitsuma, Kawasaki (JP)

(73) Assignees: Fujitsu Limited, Kawasaki (JP); Fujitsu Semiconductor Limited, Yokohama (JP)

( * ) Notice: Subject to any disclaimer, the term of this patent is extended or adjusted under 35 U.S.C. 154(b) by 546 days.

(21) Appl. No.: 13/273,837

(22) Filed: Oct. 14, 2011

(65) Prior Publication Data

US 2012/0095737 A1   Apr. 19, 2012

(30) Foreign Application Priority Data

Oct. 15, 2010  (JP) ................................. 2010-233081
Feb. 9, 2011  (JP) ................................. 2011-025564

(51) Int. Cl.
*G06F 1/00* (2006.01)
*G06F 17/50* (2006.01)

(52) U.S. Cl.
CPC .......... *G06F 17/504* (2013.01); *G06F 2217/78* (2013.01)

(58) Field of Classification Search
USPC ................................................. 713/340, 300
See application file for complete search history.

(56) References Cited

U.S. PATENT DOCUMENTS

| | | | | |
|---|---|---|---|---|
| 5,128,965 A | * | 7/1992 | Henriksson | 375/285 |
| 5,541,849 A | * | 7/1996 | Rostoker et al. | 716/102 |
| 5,555,201 A | * | 9/1996 | Dangelo et al. | 716/102 |
| 5,557,531 A | * | 9/1996 | Rostoker et al. | 716/102 |

(Continued)

FOREIGN PATENT DOCUMENTS

| | | |
|---|---|---|
| JP | 02-171861 A | 7/1990 |
| JP | 08-006980 A | 1/1996 |

(Continued)

OTHER PUBLICATIONS

Japanese Office Action issued Nov. 18, 2014 in corresponding Japanese Application No. 2011-025564.

(Continued)

*Primary Examiner* — Vincent Tran
*Assistant Examiner* — Santosh R Poudel
(74) *Attorney, Agent, or Firm* — Arent Fox LLP

(57) ABSTRACT

In a power estimator, a power coefficient-calculating section acquires an average value of the number of signal changes per unit time in each circuit range to thereby calculate a power coefficient for each circuit range or calculate a power coefficient for each circuit range when the average value of the number of signal changes per unit time is equal to 1, a correction coefficient-calculating section calculates a ratio of an average value of the number of signal changes per unit time at signal lines included in the circuit range to an average value of the number of signal changes per unit time at observing points designated in the circuit range, as a correction coefficient, and a power value-calculating section calculates a power value for each circuit range based on the correction coefficient and the power coefficient calculated for each circuit range.

13 Claims, 42 Drawing Sheets

(56) References Cited

U.S. PATENT DOCUMENTS

| | | | |
|---|---|---|---|
| 5,940,779 A * | 8/1999 | Gaitonde et al. | 702/60 |
| 6,151,568 A | 11/2000 | Allen et al. | |
| 6,205,555 B1 * | 3/2001 | Kageshima et al. | 713/300 |
| 6,397,170 B1 * | 5/2002 | Dean et al. | 703/14 |
| 6,598,209 B1 * | 7/2003 | Sokolov | 716/104 |
| 6,640,195 B1 * | 10/2003 | Bayerl et al. | 702/75 |
| 6,810,482 B1 * | 10/2004 | Saxena et al. | 713/320 |
| 6,865,526 B1 * | 3/2005 | Henkel et al. | 703/18 |
| 7,007,256 B2 * | 2/2006 | Sarkar et al. | 716/108 |
| 7,222,039 B2 * | 5/2007 | Wilcox et al. | 702/117 |
| 7,343,499 B2 * | 3/2008 | Chaudhry et al. | 713/300 |
| 7,464,278 B2 * | 12/2008 | Cohen et al. | 713/320 |
| 7,549,069 B2 * | 6/2009 | Ishihara et al. | 713/320 |
| 7,725,848 B2 * | 5/2010 | Nebel et al. | 716/136 |
| 8,041,521 B2 * | 10/2011 | Bletsch et al. | 702/60 |
| 8,060,765 B1 * | 11/2011 | Cha et al. | 713/322 |
| 8,442,786 B2 * | 5/2013 | Naffziger et al. | 702/62 |
| 2002/0194510 A1 * | 12/2002 | Swoboda | 713/300 |
| 2005/0154577 A1 * | 7/2005 | Sakane et al. | 703/27 |
| 2005/0223344 A1 * | 10/2005 | Sato et al. | 716/1 |
| 2007/0073500 A1 * | 3/2007 | Yoshikawa | 702/79 |
| 2007/0094525 A1 * | 4/2007 | Uguen et al. | 713/300 |
| 2007/0157035 A1 * | 7/2007 | Gumma et al. | 713/300 |
| 2007/0220292 A1 * | 9/2007 | Ishihara et al. | 713/320 |
| 2009/0044033 A1 * | 2/2009 | Allen | 713/322 |
| 2009/0164958 A1 * | 6/2009 | Yoshikawa | 716/6 |
| 2010/0268974 A1 * | 10/2010 | Floyd et al. | 713/340 |
| 2010/0283473 A1 * | 11/2010 | Vandensande | 324/434 |
| 2011/0016342 A1 * | 1/2011 | Rowan et al. | 713/340 |
| 2011/0225439 A1 * | 9/2011 | Emori et al. | 713/320 |
| 2013/0024713 A1 * | 1/2013 | Bajic et al. | 713/340 |

FOREIGN PATENT DOCUMENTS

| | | |
|---|---|---|
| JP | 08-249372 A | 9/1996 |
| JP | 10-254945 | 9/1998 |
| JP | 2001-318960 A | 11/2001 |
| JP | 2002-015022 A | 1/2002 |
| JP | 2002-288257 A | 10/2002 |
| JP | 2006-285835 A | 10/2006 |
| JP | 2007-102337 A | 4/2007 |
| JP | 2008-052491 A | 3/2008 |
| JP | 2008-204350 A | 9/2008 |
| JP | 2008-234187 A | 10/2008 |
| JP | 2008-234240 A | 10/2008 |
| JP | 2009-053747 A | 3/2009 |
| WO | WO 2008/038617 A1 | 4/2008 |
| WO | WO 2008/081669 A1 | 7/2008 |

OTHER PUBLICATIONS

Japanese Patent Office Action issued Jun. 24, 2014 in Japanese Patent Application No. 2011-025564.

* cited by examiner

| PATH NAME OF DESIGNATED BLOCK |
|---|
| A0 |
| A0.B0 |
| A0.B1 |
| A0.B2 |
| A1 |

FIG. 8

| GROUP NAME | PATH NAME | ATTRIBUTE |
| --- | --- | --- |
| A0.B0.C0. Part A | A0.B0.C0. inst_cell0 | CELL INSTANCE |
| | A0.B0.C0. inst_cell1 | CELL INSTANCE |
| | ... | ... |
| | A0.B0.C0. inst_cellN | CELL INSTANCE |
| | A0.B0.C0. net0 | NET INSTANCE |
| | A0.B0.C0. net1 | NET INSTANCE |
| | ... | ... |
| | A0.B0.C0. netM | NET INSTANCE |
| A0.B0.C0. Part B | A0.B0.C0. inst_cellN+1 | CELL INSTANCE |
| | ... | ... |
| | A0.B0.C0. inst_cellP | CELL INSTANCE |
| | A0.B0.C0. netM+1 | NET INSTANCE |
| | ... | ... |
| | A0.B0.C0. netQ | NET INSTANCE |

FIG. 9

| DESIGNATED TIME SECTION || SAMPLING TIME PERIOD |
|---|---|---|
| START | END | |
| 0 ms | 10 ms | 1 ms |
| 10 ms | 100 ms | 10 ms |
| 100 ms | 110 ms | 0.5 ms |

FIG. 11

| CIRCUIT RANGE | SAMPLING SECTION | | | |
|---|---|---|---|---|
| | 0ms – 1ms | 1ms – 2ms | 2ms – 3ms | 3ms – 4ms |
| A | 10 [M] | 11 [M] | 5 [M] | 7.5 [M] |
| B | 2 [M] | 4 [M] | 1 [M] | 0 [M] |
| C | 3 [M] | 5 [M] | 2 [M] | 1 [M] |
| <Other> | 0 [M] | 0 [M] | 0 [M] | 0 [M] |

FIG. 12

| CIRCUIT RANGE | POWER COEFFICIENT | AVERAGE CHANGE DENSITY [NUMBER OF SIGNAL CHANGES/ SECOND] |
| --- | --- | --- |
| A | 1,000[mW] | 1 [G] |
| B | 2,000[mW] | 1 [G] |
| C | 3,000[mW] | 1 [G] |
| <Other> | 100[mW] | 1 [G] |

FIG. 14

| CIRCUIT RANGE | CORRECTION COEFFICIENT |
|---|---|
| A | 1.06 |
| B | 1 |
| C | 1.14 |
| <Other> | 1 |

FIG. 16

| CIRCUIT RANGE | SAMPLING SECTION | | | |
| --- | --- | --- | --- | --- |
| | 0ms − 1ms | 1ms − 2ms | 2ms − 3ms | 3ms − 4ms |
| A | 10.6 [mW] | 11.66 [mW] | 5.3 [mW] | 7.95 [mW] |
| B | 4 [mW] | 8 [mW] | 2 [mW] | 0 [mW] |
| C | 10.26 [mW] | 17.1 [mW] | 6.84 [mW] | 3.42 [mW] |
| \<Other\> | 0 [mW] | 0 [mW] | 0 [mW] | 0 [mW] |

FIG. 17

| CIRCUIT RANGE | AVERAGE CHANGE DENSITY [NUMBER OF SIGNAL CHANGES/SECOND] |
|---|---|
| A | 7.5 [M] |
| B | 7 [M] |
| C | 3.5 [M] |

FIG. 23

| CIRCUIT RANGE | AVERAGE CHANGE DENSITY [NUMBER OF SIGNAL CHANGES/SECOND] |
|---|---|
| A | 8 [M] |
| B | 7 [M] |
| C | 4 [M] |

FIG. 24

| CASE | | NUMBER OF MEASUREMENT CIRCUITS | RATE OF INCREASE |
|---|---|---|---|
| (CASE 1) | UNIFORMLY TO DEPTH OF 3RD LAYER + 1024-DIVISION | 1,097 | 56% |
| (CASE 2) | DESIGNATED BY PATH + 1024-DIVISION | 350 | 52% |
| (CASE 3) | DESIGNATED BY PATH + 8096-DIVISION | 85 | 51% |

FIG. 25

METHOD AND SYSTEM FOR POWER ESTIMATION BASED ON A NUMBER OF SIGNAL CHANGES

CROSS-REFERENCE TO RELATED APPLICATIONS

This application is based upon and claims the benefit of priority of the prior Japanese Patent Application No. 2010-233081, filed on Oct. 15, 2010, and the Japanese Patent Application No. 2011-025564, filed on Feb. 9, 2011, the entire contents of which are incorporated herein by reference.

FIELD

The embodiments discussed herein are related to a power estimator, a power estimation method, and a computer-readable medium storing a program.

BACKGROUND

In an electronic system, it is important to evaluate power consumption. The power consumption deeply affects both the unit price and quality of a product.

Conventionally, there have been proposed a method of calculating values of power of signal lines and values of power of logic cells (e.g. minimum units in logic synthesis, such as AND circuits and OR circuits) in a circuit to be evaluated, and then adding up these calculated values of power, to thereby calculate the overall dynamic power of the circuit.

The power of each signal line is determined e.g. by determining a change density D (the number of signal changes/second) of the signal in the signal line by logic simulation, and calculating ½×C (load capacity of the signal)×V (voltage)²×D.

Conventionally, there has been known a method of measuring the above-mentioned number of signal changes (the number of times a signal changes state) using a measurement circuit that is often used on an emulator. Further, to reduce the number of measurement circuits, there has also been known a method of counting the number of signal changes from a plurality of signal lines, using a single counter.

By the way, these days, scratch development has come to be planned less frequently. A system architect configures a system by properly combining black-box components, and evaluates whether the configured system achieves the performance, power consumption, and quality demanded by his client. Therefore, it is important to intuitively understand power (requirements or consumption) of the system, and hence there is a demand for a system-level power estimation covering a long time period.

Japanese Laid-open Patent Publication No. 2002-288257
Japanese Laid-open Patent Publication No. 2009-53747
Japanese Laid-open Patent Publication No. 2007-102337
Japanese Laid-open Patent Publication No. 08-249372
Japanese Laid-open Patent Publication No. 02-171861
Japanese Laid-open Patent Publication No. 08-6980
Japanese Laid-open Patent Publication No. 2006-285835
U.S. Pat. No. 6,151,568 Specification
International Publication Pamphlet No. WO2008/038617
International Publication Pamphlet No. WO2008/081669
Japanese Laid-open Patent Publication No. 2008-234240
Japanese Laid-open Patent Publication No. 2008-204350
Japanese Laid-open Patent Publication No. 2001-318960

However, in the conventional power estimation method, it is difficult to accurately analyze a power consumption tendency covering a long time period (e.g. not shorter than the order of seconds) for a large-scale circuit.

The reason for this difficulty includes e.g. increases in the number of measurement circuits and the amount of measurement data, and an increase in time for power estimation. Further, if an easy measure, such as reduction of the number of signal lines to be observed, is taken, the accuracy of the power estimation lowers.

SUMMARY

According to an aspect of the invention, there is provided a power estimator including a power coefficient-calculating unit configured to acquire an average value of the number of signal changes per unit time in each circuit range to thereby calculate a power coefficient for each circuit range or calculate a power coefficient for each circuit range when the average value of the number of signal changes per unit time is equal to 1, a correction coefficient-calculating unit configured to calculate a ratio of an average value of the number of signal changes per unit time at signal lines included in the circuit range to an average value of the number of signal changes per unit time at observing points designated in the circuit range, as a correction coefficient, and a power value-calculating unit configured to calculate a power value for each circuit range based on the correction coefficient and the power coefficient calculated for each circuit range.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates an example of designation of circuit ranges by a user;

FIG. 9 illustrates another example of the designation of circuit ranges by the user:

FIG. 11 illustrates an example of sampling time periods;

FIG. 12 illustrates an example of generated average change density data;

FIG. 14 illustrates an example of power coefficient data;

FIG. 16 illustrates an example of correction coefficient data;

FIG. 17 illustrates an example of a result of power estimation;

FIG. 23 illustrates an example of an average change density list of signals at observing points, on a circuit range basis;

FIG. 24 illustrates an example of an average change density list of signals at signal lines corresponding to factors to be calculated, on a circuit range basis;

FIG. 25 illustrates the numbers of generated measurement circuits and respective ratios of areas of the measurement circuits to an area of an evaluated circuit (ratios of increase);

DESCRIPTION OF EMBODIMENTS

Figure 1:
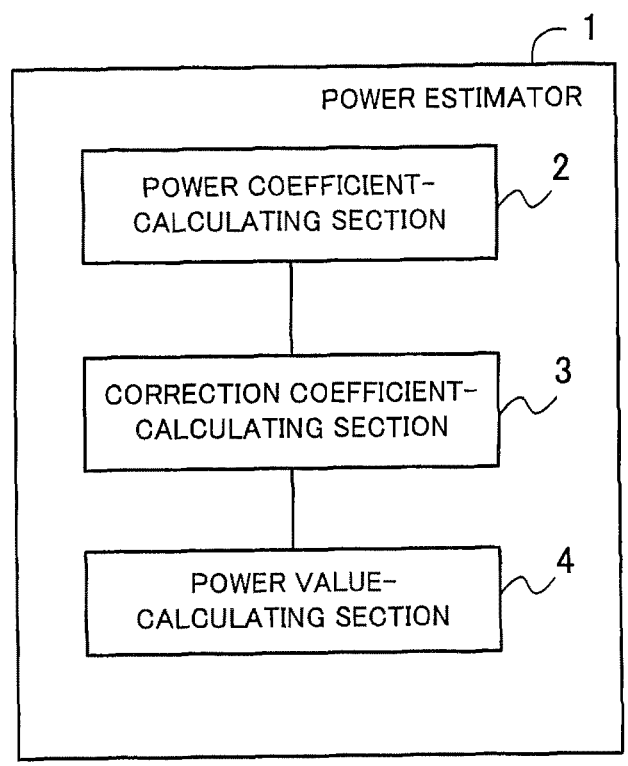
FIG. 1 illustrates an example of a power estimator according to a first embodiment.

Embodiments of the present invention will be explained below with reference to the accompanying drawings, wherein like reference numerals refer to like elements throughout.

(First Embodiment)

FIG. 1 illustrates an example of a power estimator according to a first embodiment.

The power estimator, denoted by reference numeral 1, includes a power coefficient-calculating section 2, a correction coefficient-calculating section 3, and a power value-calculating section 4.

The power coefficient-calculating section 2 acquires an average value of the number of signal changes per unit time in each circuit range to thereby calculate a power coefficient for each circuit range.

Here, the circuit range is e.g. a circuit block including a plurality of cells (logic cells) and signal lines in a circuit to be subjected to power estimation. For example, this circuit range includes a combinational circuit.

The number of signal changes per unit time is hereinafter referred to as a change density, and an average value of change densities is referred to as an average change density.

The power coefficient-calculating section 2 calculates a power value (sum of power values of signal lines and cells) when the average change density of the signals of the signal lines in each circuit range is equal to a certain value, as a power coefficient for each circuit range. The power coefficient-calculating section 2 acquires an appropriate average change density on a circuit range-by-circuit range basis from a user, for example.

Although details will be described hereinafter, the power coefficient-calculating section 2 determines the power value of cells and signal lines in each circuit range, based on the acquired average change density and data for evaluation (evaluation data) including design data of the circuit to be evaluated, and calculate the power coefficient.

By this calculation, essentially, power per one average change density of each circuit range is determined. The present embodiment illustrates an example that makes use of the existing technique of power estimation. An amount of power per one signal change of each circuit range may be calculated based on an amount of power per one signal change within each cell (=power per one change density), which is calculated on a cell-by-cell basis, and an amount of power per one signal change of wiring multiplied by ½×C (load capacity of the signal)×V (voltage)$^2$.

The correction coefficient-calculating section calculates a ratio of the average change density of signals at respective signal lines included in a circuit range to the average change density of signals at observing points designated in the circuit range, as a correction coefficient.

The observing points include e.g. input data terminals of flip-flops, output data terminals, signals randomly selected in the circuit, and signals in bus notation in a netlist.

For example, the correction coefficient-calculating section 3 performs a logic simulation for a time period shorter than a time period for the power estimation, to thereby acquire waveform data for a time period desirable for calculating a correction coefficient (e.g. a time period during which a circuit range to be subjected to the correction coefficient calculation frequently operates). Then, the correction coefficient-calculating section 3 determines, based on the acquired waveform data, e.g. an average change density of signals at observing points designated by the user in the circuit range and e.g. an average change density of signals at respective signal lines included in the circuit range. The correction coefficient-calculating section 3 further calculates the correction coefficient based on the ratio of the above two average change densities (the average change density of signals of the signal lines/the average change density of signals at the observing points).

Note that the correction coefficient-calculating section 3 may acquire the waveform data using an emulator, or may acquire the waveform data using a logic simulator which is software.

The power value-calculating section 4 calculates, based on the correction coefficient and the power coefficient calculated for each circuit range, a power value on a circuit range-by-circuit range basis. Although details will be described hereinafter, the power value-calculating section 4, for example, multiplies a ratio of an average change density (average change density not during the desirable time period but during the time period for the power estimation) of signals at observing points in each circuit range, determined from a waveform data during a certain sampling section of logic simulation, to an average change density input by the user, by the power coefficient and the correction coefficient. In other words, the power value-calculating section 4 multiplies the average change density at the observing points in each circuit range by power per one average change density of the signals in this circuit range and the correction coefficient. By this calculation, the power value-calculating section 4 calculates the power value during the sampling section for each circuit range.

The following description is given of operations of the power estimator 1.

Figure 2:
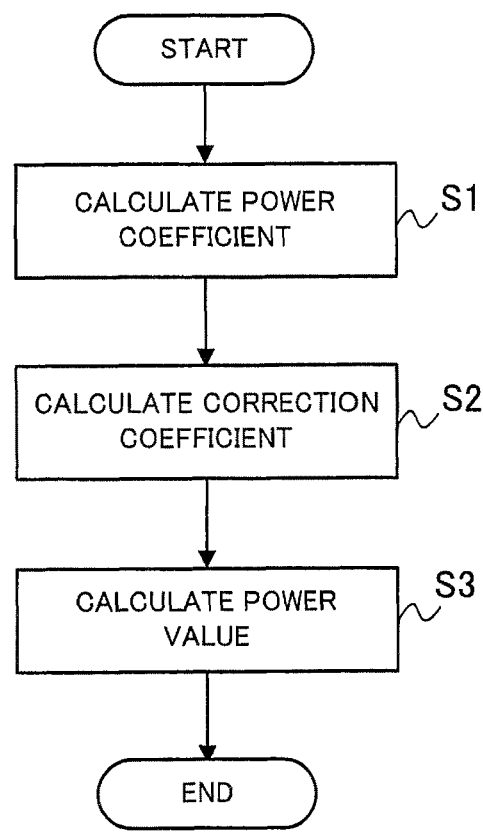
FIG. 2 is a flowchart of an example of operations of the power estimator.

FIG. 2 is a flowchart of an example of operations of the power estimator.

Step S1: The power coefficient-calculating section 2 acquires average change densities in respective circuit ranges and calculates a power coefficient for each circuit range.

Step S2: The correction coefficient-calculating section 3 calculates a ratio of an average change density of signals at respective signal lines included in each circuit range to an average change density of signals at observing points designated in the circuit range, as a correction coefficient.

Step S3: The power value-calculating section 4 calculates, based on the correction coefficient and power coefficient of each circuit range, a power value for each circuit range.

According to the power estimator 1 described above, it is possible, for example, to determine a power value for each circuit range larger than a cell, based on the average change density of signals at the designated observing points. This reduces the amount of data to be measured and a measurement time period, which makes it possible to analyze the tendency of power consumption in a large-scale circuit in a manner covering a long time period. Further, by using the correction coefficient, which is a ratio of the average change density of signals at respective signal lines included in the circuit range to the average change density of signals at observing points designated in the circuit range, it is possible to accurately estimate power even when a small number of observing points are employed.

(Second Embodiment)

Figure 3:
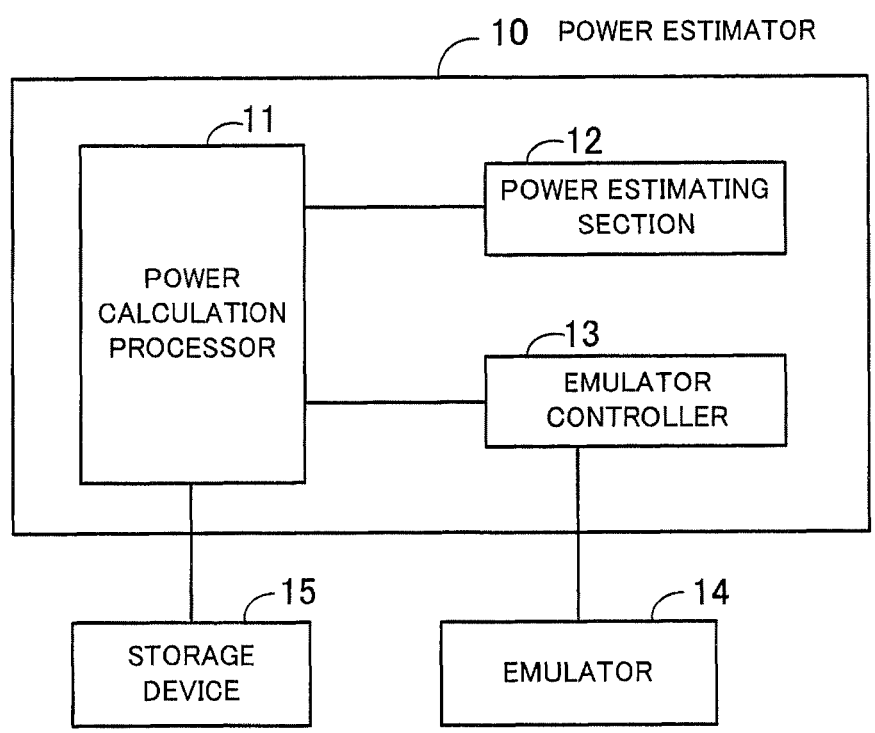
FIG. 3 illustrates an example of a power estimator according to a second embodiment.

FIG. 3 illustrates an example of a power estimator according to a second embodiment.

The power estimator, denoted by reference numeral 10, is implemented by e.g. a computer, and includes a power calculation processor 11, a power estimating section 12, and an emulator controller 13. Each of these sections 11, 12 and 13 can be realized by software.

The power calculation processor 11 estimates power consumed in a circuit to be evaluated using the power estimating section 12 and an emulator 14. A result of power estimation output from the power calculation processor 11 includes information from which waveform data of a lot of samples can be generated for a long time period. The power calculation processor 11 includes two functional blocks described below.

Figure 4:
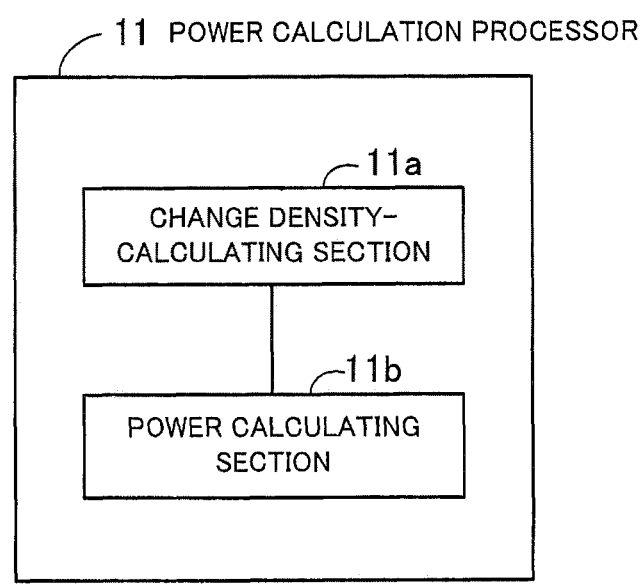
FIG. 4 illustrates an example of functional blocks of a power calculation processor.

FIG. 4 illustrates an example of the functional blocks of the power calculation processor 11.

The power calculation processor 11 includes a change density-calculating section 11a, and a power calculating section 11b.

The change density-calculating section 11a calculates an average change density, which is an average value of the number of signal changes per unit time at observing points, on a circuit range-by-circuit range basis.

The power calculating section 11b has the functions of the power coefficient-calculating section 2, the correction coefficient-calculating section 3, and the power value-calculating section 4 of the power estimator 1 according to the first embodiment, and calculates power on a circuit range-by-circuit range basis.

Referring again to FIG. 3, the power estimating section 12 estimates power on a cell-by-cell basis, or on a signal line-by-signal line basis.

The emulator controller 13 controls the emulator 14 connected to the power estimator 10.

The emulator 14 performs emulation (hereinafter sometimes referred to as the simulation) based on the design data. The emulator 14 is connected to the power estimator 10 e.g. as an expansion device of an expansion bus (e.g. PCI (peripheral component interconnect) Express) of a computer.

After completing the operation instructed by the emulator controller 13, the emulator 14 sends an interrupt signal to the emulator controller 13. When a next command is sent from the emulator controller 13, the emulator 14 again performs an operation according to the received command. By repeating the above-mentioned sequence of operations, the simulation is executed. The command sent to the emulator 14 is described by the user in a script language for the emulator controller 13, for example.

A storage device 15 is connected to the power estimator 10. The storage device 15 is e.g. a hard disk drive (HDD), a RAM (random access memory), or the like. The storage device 15 stores various kinds of data, such as data for emulation (emulation data), data for evaluation (evaluation data), results of power estimation, emulation data processed by the power calculation processor 11, and data of measurement results by the emulator 14. Further, the storage device 15 may accumulate past measurement results. By making use of the past measurement results, it is possible to estimate power at an early stage of designing. The storage device 15 may be provided within the power estimator 10.

Note that in place of the emulator 14, a board using an FPGA (field-programmable gate array) may be used. The board using the FPGA is also connected to the power estimator 10, as an expansion device connected to the expansion bus. When the board using the FPGA is used, for example, the user designs a communication part. In this case, the emulator controller 13 is e.g. a device driver designed by the user. Then, a target circuit which can communicate with the device driver is incorporated in a test bench which is mounted on the board using the FPGA. Further, for example, a function of processing a protocol between the device driver and the test bench (e.g. designed by the user) is implemented in the device driver and the test bench.

The emulator 14 has a function of acquiring waveform data of each signal line in the design data. On the other hand, in the board using the FPGA, since the device driver and the test bench are developed on user's own responsibility, as mentioned above, it is general that the board using the FPGA is not equipped with such a function. Therefore, it is assumed that processing using waveform data is executed by an emulator, or an alternative means, such as a logic simulation of software of a RTL (register transfer level) or a gate level.

Figure 5:
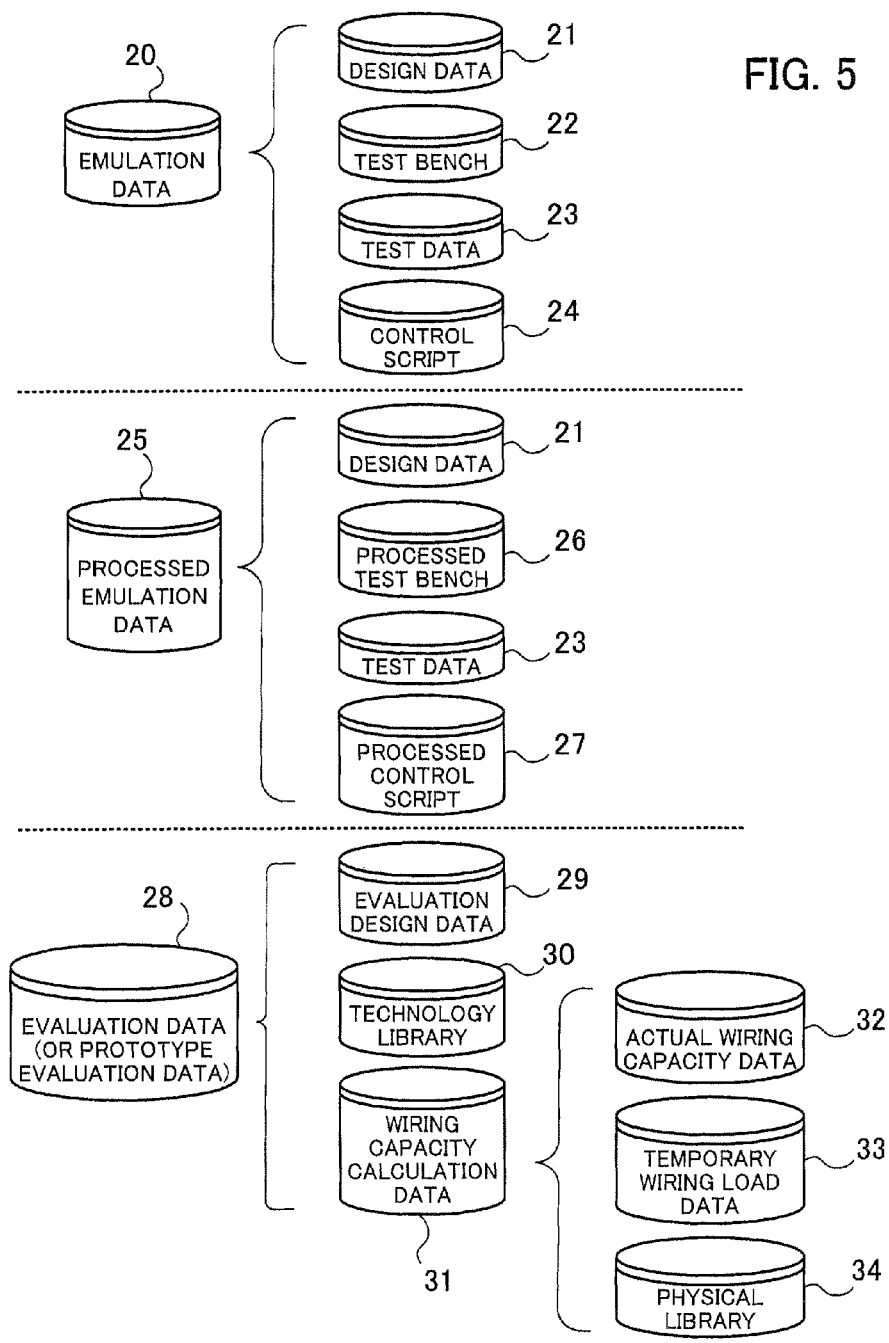
FIG. 5 is an example of data handled by the power estimator.

FIG. 5 is an example of data handled by the power estimator.

An emulation data 20 includes a design data 21 of a circuit to be evaluated, a test bench 22, test data 23, and a control script 24.

The design data 21 is e.g. data described in a netlist or data described at RTL. The test bench 22 is a test bench for the design data 21, and is incorporated in the emulator 14. The test data 23 is e.g. initialization data for the RAM, input data from the outside, or the like, and is loaded in RAMs defined by the design data 21 and the test bench 22 according to the control script 24. The control script 24 is a script in which a flow of the control of the emulator 14 is described.

Processed emulation data 25 processed by the power calculation processor 11 includes, for example, not only the above-mentioned design data 21 and test data 23 but also a processed test bench 26 and a processed control script 27. These will be described hereinafter.

Evaluation data 28 to be input to the power calculation processor 11 includes evaluation design data 29, a technology library 30, and wiring capacity calculation data 31.

The evaluation design data 29 is a netlist or design data for evaluation which is described e.g. at RTL. The evaluation design data 29 may be the same as or may be different from the design data 21 included in the emulation data 20. The technology library 30 is a collection of characteristics associated with the respective cells, including information, such as electric characteristics of the respective cells, and is referred to when a power value is calculated.

The wiring capacity calculation data 31 is used for determining a wiring capacity. What type of data is used depends on a method of estimation of power by the power estimating section 12. Examples of the wiring capacity calculation data 31 include an actual wiring capacity data 32, a temporary wiring load data 33, and a physical library 34.

The actual wiring capacity data 32 is obtained from the wiring capacity extracted from the layout result. The actual wiring capacity data 32 is e.g. SPEF (standard parasitic exchange format) data. The temporary wiring load data 33 determines a wiring capacity based on an area of a circuit and the number of fan-out, and is included e.g. in the technology library 30. The physical library 34 is used for calculation of a wiring capacity by PLE (physical layout estimation) which is a logic synthesis tool, and is e.g. LEF (library exchange format) data.

The wiring capacity calculation data 31 thus configured is referred to when calculating a power value in signal lines.

Note that the evaluation data 28 may be formed by data of a prototype representative of a layout design being underway (before completion) (details will be described hereinafter).

Figure 6:
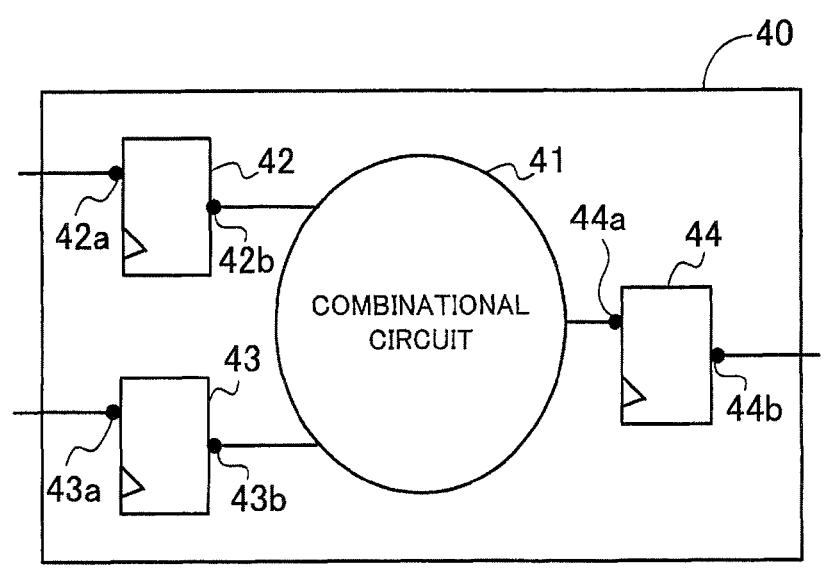
FIG. 6 illustrates an example of observing points.

FIG. 6 illustrates an example of observing points.

A circuit range 40 includes a combinational circuit 41, and flip-flops 42, 43, and 44. Note that in the flip-flops 42 to 44, illustration of wiring for clocks is omitted.

The observing points include e.g. input data terminals 42a, 43a, and 44a, or output data terminals 42b, 43b, and 44b of the flip-flops 42 to 44.

Hereafter, a description will be given of operations of the power estimator 10.

Factors causing power consumption include power consumption by a clock tree, power consumption by RAMs and ROMs, power consumption by registers, and power consumption by a combinational circuit (except a clock tree). Hereafter, the combinational circuit will be described as a factor causing the consumption of power to be calculated (hereinafter referred to as the factor to be calculated). Further, an input data terminal of each flip-flop is employed as an observing point.

Figure 7:
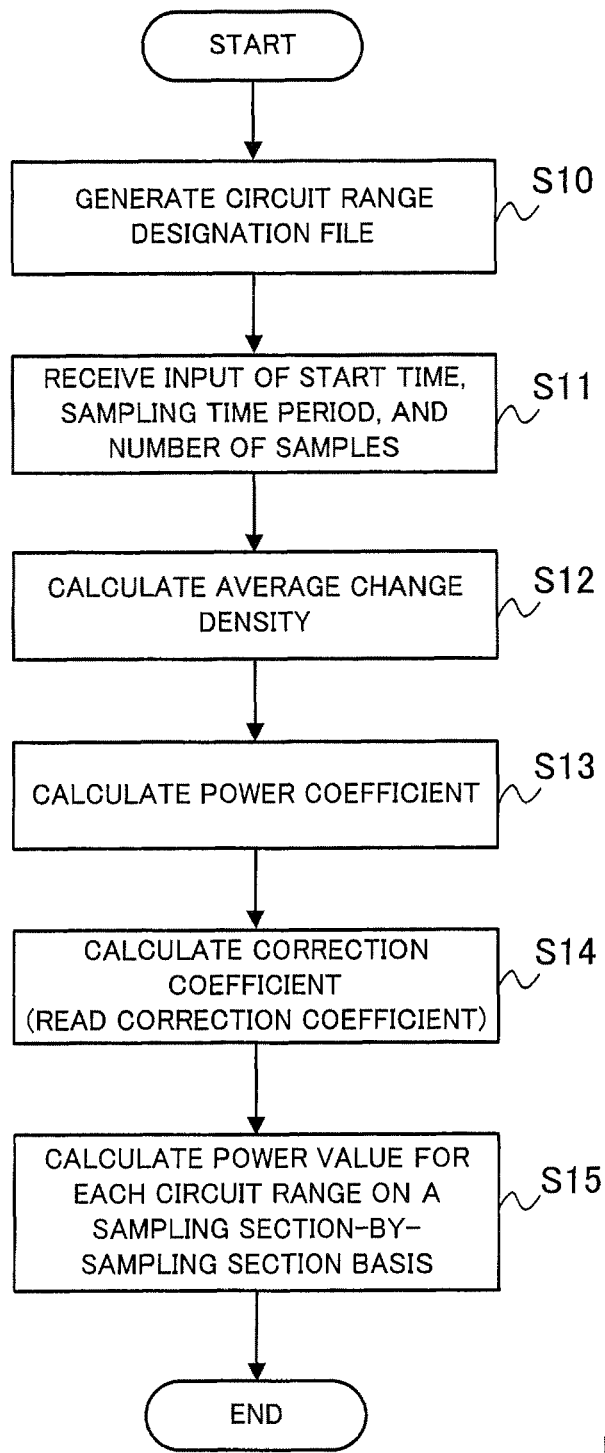
FIG. 7 is a flowchart of a process executed by the power estimator.

FIG. 7 is a flowchart of a process executed by the power estimator.

The change density-calculating section 11a generates a circuit range designation file e.g. based on circuit ranges designated by the user (step S10).

FIG. 8 illustrates an example of designation of circuit ranges by a user.

The user designates a circuit range e.g. by the name of a path to a block. For example, "A0.B1" represents a path to a block B1 included in a block A0. In this case, the block B1 is set as a circuit range. When A0 is designated as a path name, for example, part within the block A0 other than blocks B0, B1, and 32 is set as one circuit range.

A specific condition may be further added. In the case of power estimation of the combinational circuit, for example, a condition that "cells and signal lines included in a combinational circuit (except a clock tree) in a designated block are set as a circuit range" may be added.

FIG. 9 illustrates another example of designation of the circuit ranges by the user.

The user may designate a circuit range by designating a path name (attribute of which is cell instance) of a cell or a path name of a signal (attribute of which is net instance) as illustrated in FIG. 9. This designation method enables designation of a circuit range in a manner not bound by an interface of a block. For example, it is possible to determine a total value of the number of signal changes by dividing the circuit into data paths and control systems.

Note that in the following description, a description will be given of the former case where a circuit range is designated by a name of a path to a block, by way of example. For a block which is not designated by a path name, a circuit range of the other block is set.

Figure 10:
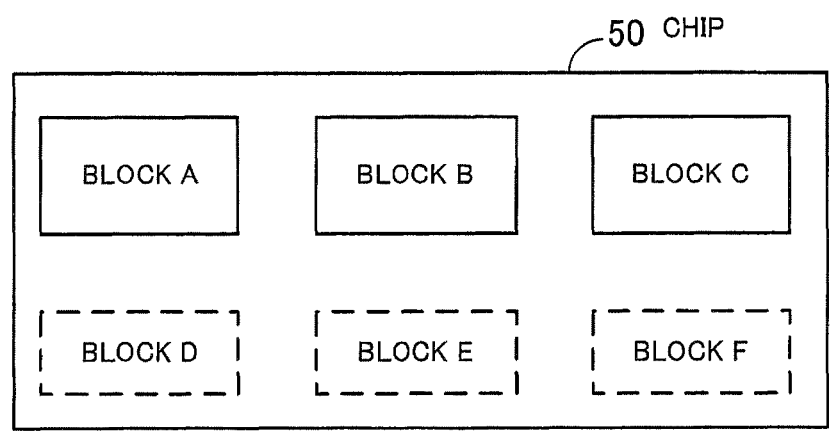
FIG. 10 illustrates an example of design data.

FIG. 10 illustrates an example of design data. A chip 50 includes blocks A, B, C, D, E, and F.

In this example, if the blocks A, B, and C are designated by the user, these blocks are set as respective circuit ranges, and for example, the undesignated blocks D, E, and F, and chip part other than the blocks A to F, which are indicated by broken lines, are set as one circuit range.

When the circuit ranges are thus designated to generate the circuit range designation file, the change density-calculating section 11a receives inputs of the start time, sampling time period, and number of samples, for power estimation, from the user (step S11).

Although it is assumed in the following description that the start time is set to 0 ms, the sampling time period is set to 1 ms, and the number of samples is set to four, this is not limiting as the change density-calculating section 11a may change the sampling time period or the like, depending on time, for example.

FIG. 11 illustrates an example of sampling time periods.

The sampling time period is changed to 1 ms, 10 ms, and 0.5 ms for designated time sections between 0 ms and 10 ms, between 10 ms and 100 ms, and between 100 ms and 110 ms, respectively.

After execution of the step S11, the change density-calculating section ha calculates average change densities (step S12). The change density-calculating section 11a refers to the emulation data 20 as illustrated in FIG. 5 to generate an observing point list in which observing points are designated. Then, the change density-calculating section 11a calculates, based on results of measurement of the number of signal changes at the observing points by a simulation, described hereinafter, an average change density for each circuit range on a sampling section-by-sampling section basis. With this processing, for example, the following average change density data is generated.

FIG. 12 illustrates an example of the generated average change density data.

There are illustrated average change densities (number of signal changes (in units of mega)/second) for each circuit range on a sampling section-by-sampling section basis. Note that FIG. 12 illustrates a case where the blocks A, B, and C are set as the circuit ranges, as illustrated in FIG. 10. For example, in the sampling section between 0 ms and 1 ms for the block A, the average change density of the signals at the observing points is 10M (the number of signal changes/second).

"<Other>" represents e.g. the blocks D, E, and F, and the chip parts other than the designated parts of the blocks A to C, which are not designated as circuit ranges in FIG. 10. Details of a method of calculating an average change density will be described hereinafter.

Figure 13:
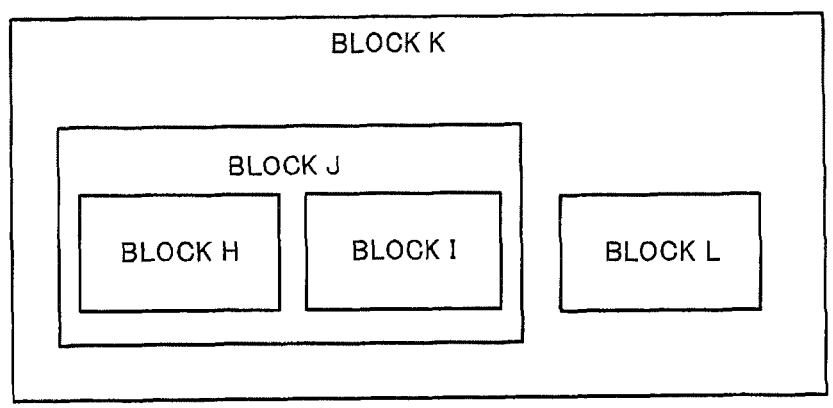
FIG. 13 illustrates an example of design data having a hierarchical structure.

FIG. 13 illustrates an example of design data having a hierarchical structure.

FIG. 13 illustrates a case where blocks J and L are included in a block K, and further, blocks H and I are included in the block J.

When all of the blocks H, I, J, K, and L are designated as the circuit ranges, the change density-calculating section 11a determines an average change density at associated observing points for each of the blocks H, I, and L. For the block J, the change density-calculating section 11a determines an average change density at observing points in part of the block J other than the blocks H and I. For the block K, the change density-calculating section 11a determines an average change density at observing points in part of the block K other than the blocks J and L.

There may be employed a method of simply calculating an average change density for the designated range. For example, the average change densities in the blocks J and K can be obtained by determining the average change densities of signals of the signal lines at observing points in blocks included in the blocks. By doing this, even when there are a lot of observing points in a child block but there are a small number of observing points at a hierarchical level of the self block (hierarchical level immediately above the child block), it is possible to obtain advantageous effects by using the average change densities at the observing points in the child block in place of the self block. An experimental example 1, described hereinafter, illustrates a result of calculation using this calculation method.

After execution of the step S12, the power calculating section 11b calculates a power coefficient using the power estimating section 12 (step S13). Further, at this time, the power calculating section 11b generates a list of signal lines which belong to a factor to be calculated, by referring to the evaluation data 28.

In calculating the power coefficient, the power calculating section 11b refers to the circuit range designation file, the observing point list, and the evaluation data 28 as illustrated in FIG. 5. The power calculating section 11b further acquires the average change densities of signals in the circuit ranges e.g. from the user, and calculates the power coefficients as power values in the respective circuit ranges associated with the acquired average change densities, using the power estimating section 12, to output the power coefficients as power coefficient data. The power coefficient/the average change density designated by the user is a power amount per one average change density, and hence it is a coefficient concerning a circuit of the evaluation design data 29 in the evaluation data 28 and a technology to be used, so that the coefficient can be used as reference data e.g. when the technology is changed.

FIG. 14 illustrates an example of the power coefficient data.

FIG. 14 illustrates an example of a power coefficients calculated for each circuit range based on a designated change density. In FIG. 14, the power coefficient in a circuit range A (e.g. corresponds to the block A illustrated in FIG. 10) is 1,000 [mW], and the average change density is 1 [number of signal changes (in units of giga)/second].

Since an average change density value and the power value to be assumed when the average change density value is used are thus specified, the power coefficient data includes data by which the power coefficient per one average change density (power amount per one average change density) is determined.

As for the design data having a hierarchical structure as illustrated in FIG. 13, the power calculating section 11b calculates the power coefficient as follows: When the blocks H, I, J, K, and I are all designated as the circuit ranges, the power calculating section 11b determines power coefficients for the blocks H, I, and L. For the block J, the power calculating section 11b determines a power coefficient using the power coefficients of part of the block J other than the blocks H and I. For the block K, the power calculating section 11b determines a power coefficient using the power coefficients of part of the block K other than the blocks J and L.

After execution of the step S13, the power calculating section 11b calculates a correction coefficient for each circuit range by referring to the circuit range designation file and the evaluation data 28, and outputs the correction coefficients as the correction coefficient data (step S14). Note that if there are correction coefficients which were calculated and stored in the storage device 15 in the past, the power calculating section 11b may read out the stored correction coefficients.

The power calculating section 11b calculates a ratio of an average change density at observing points in each circuit range to an average change density of signals of signal lines which belong to a factor to be calculated in the circuit range, as a correction coefficient e.g. based on waveform data acquired by simulation for a time period shorter than a time period for power estimation (power estimation time period).

Figure 15:
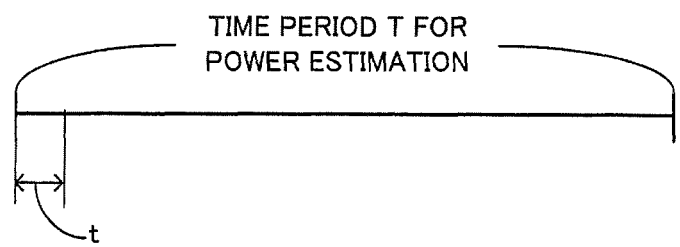
FIG. 15 illustrates an example of a time period for simulation for calculating a correction coefficient.

FIG. 15 illustrates an example of a time period for simulation for calculating a correction coefficient.

For example, the power calculating section 11b acquires waveform data during a time period t desirable for calculating the correction coefficient by simulation (e.g. a time period in which a circuit range to be subjected to correction coefficient calculation frequently operates). The time period t is sufficiently shorter than a power estimation time period T, and hence the amount of waveform data to be acquired can be made smaller.

For each circuit range, the power calculating section 11b determines, based on acquired waveform data, e.g. an average change density at observing points designated by the user and e.g. an average change density of signals at all signal lines included in the circuit range. Further, the correction coefficient-calculating section 3 calculates a correction coefficient based on a ratio between the above-mentioned two types of average change densities (average change density of all signal lines/average change density at the designated observing points).

Note that the power calculating section 11b may be configured to use correction coefficients designated by being input from the user based on his experience.

FIG. 16 illustrates an example of the correction coefficient data.

For example, for the circuit range A, the correction coefficient is set to 1.06. This indicates that signals of the signal lines which belong to the factor to be calculated have a tendency to change more frequently than signals at the observing points by 6% on average.

After execution of the step S14, the power calculating section 11b calculates a power value for each circuit range on a sampling section-by-sampling section basis, and outputs the calculated values as a result of power estimation (step S15). The power calculating section 11b calculates each power value, based on the average change density determined for each circuit range on a sampling section-by-sampling section basis (see FIG. 12), the power coefficient in the designated average change density (see FIG. 14), and the correction coefficient determined for each circuit range (see FIG. 16), by the following equation:

power value in sampling section Y in circuit range
X=((average change density in sampling section
Y in circuit range X)/(average change density in
circuit range X))×(power coefficient in average
change density designated for circuit range X)×
(correction coefficient in circuit range X)    (Equation 1)

The following gives an example of calculation of a power value in the sampling section between 0 ms and 1 ms in the circuit range A.

From FIG. 12, the average change density in the sampling section between 0 ms and 1 ms in the circuit range A is 10 [mega signal changes/second]. From FIG. 14, the average change density designated for the circuit range A is 1 [giga signal changes/second], and the power coefficient at the time is 1 [W]. Further, from FIG. 16, the correction coefficient in the circuit range A is 1.06. When these values are applied to (Equation 1), it gives 10 [mega signal changes/second]/1 [giga signal changes/second]×1 [W]×1.06=10.6 [mW].

Thus, the power value in the sampling section between 0 ms and 1 ms in the circuit range A, which turns out to be 10.06 [mW], is calculated.

FIG. 17 illustrates an example of the result of power estimation.

The power calculating section 11b calculates the power values for all of the sampling sections in all of the circuit ranges using (Equation 1), and outputs the result of power estimation as illustrated in FIG. 17. The power calculating section 11b may output the result of power estimation as illustrated in FIG. 17 as electric waveform data as described hereinafter.

Figure 18:
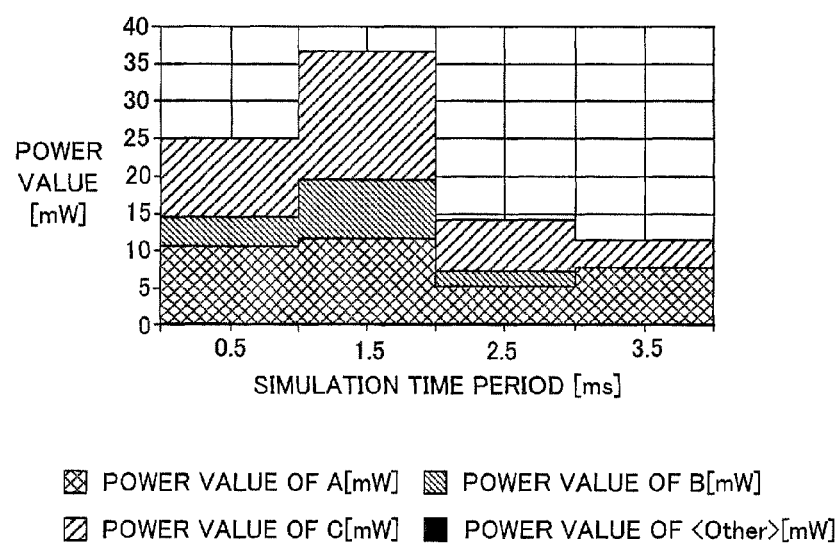
FIG. 18 illustrates an example in which the result of power estimation is expressed by power waveforms.

FIG. 18 illustrates an example in which the result of power estimation is converted to a power waveform. The horizontal axis represents the simulation time period [ms], and the vertical axis represents the power value [mW].

The respective power values of the circuit ranges A, B, C, and <Other> are illustrated in a graph. The power calculating section 11b generates and outputs the graph as illustrated in FIG. 18, which enables the user to easily understand changes in power depending on time.

In the case of design data having a hierarchical structure as illustrated in FIG. 13, the power calculating section 11b calculates a power value as follows: Assuming that the blocks H, I, J, K, and L are all designated as circuit ranges, the power calculating section 11b determines a power value for each of the blocks H, I, and L by the above-described method. For the block J, the power calculating section 11b determines a power value by calculating a power value of part of the block J other than the blocks H and I, and adding the calculated value to the power values of the blocks H and I. For the block K, the power calculating section 11b determines a power value by calculating a power value of part of the block K other than the blocks Jr and L, and adding the calculated value to the power values of the blocks J and L.

(Details of Average Change Density Calculation Process)

Hereafter, a detailed description will be given of the process for calculating an average change density in the step S12 illustrated in FIG. 7.

Figure 19:
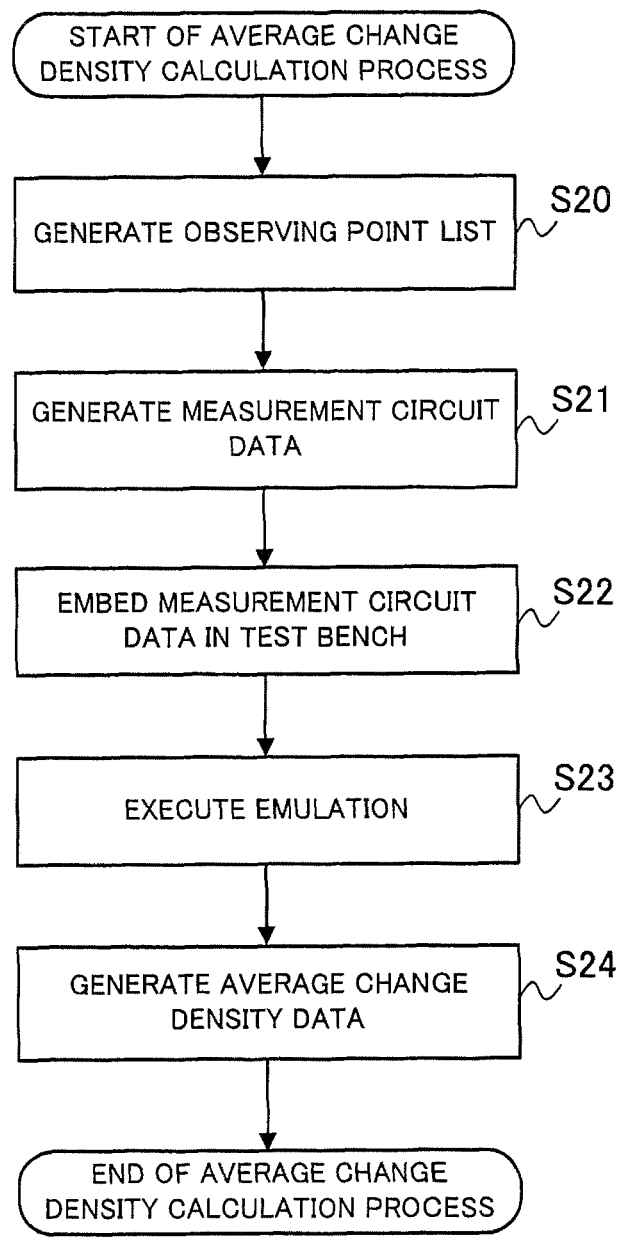
FIG. 19 is a flowchart of a process for calculating an average change density.

FIG. 19 is a flowchart of a process for calculating an average change density.

The change density-calculating section 11a, first, generates an observing point list (step S20). In the present embodiment, input data terminals of flip-flops are set as observing points, by way of example, and hence the change density-calculating section 11a generates and outputs a list of the input data terminals of the flip-flops.

When the design data 21 of the emulation data as illustrated in FIG. 5 is a netlist, the change density-calculating section 11a, first, extracts names of cells of the flip-flops from the technology library 30. Next, the change density-calculating section 11a loads the netlist into a memory, not shown, of the power estimator and extracts all paths to instances of cells corresponding to the extracted cell names. Further, the change density-calculating section 11a extracts paths to the input data terminals of the respective instances to generate an observing point list.

When the design data 21 is described at RTL, the change density-calculating section 11a first executes compiling of the design data 21 for emulation, and then generates a netlist mapped to the technology library 30 for emulation. Hereafter, the change density-calculating section 11a performs the same processing as that performed in the case where the design data 21 is a netlist, and generates an observing point list.

Next, the change density-calculating section 11a generates measurement circuit data (step S21). The change density-calculating section 11a performs grouping of the signal lines of the observing point list (input data terminals of the flip-flops in the present embodiment) by referring to the circuit range designation file. Then, based on the result of grouping, the change density-calculating section 11a generates the measurement circuit data for measuring signals at the input data terminals of each group. Note that a measurement circuit which takes into account grouping and a method of generating a measurement circuit are described in Japanese Laid-open Patent Publication No. 2009-53747 and Japanese Laid-open Patent Publication No. 2007-102337, respectively, and hence detailed description thereof is omitted.

In the grouping operation, the change density-calculating section 11a groups all of the signal lines within a circuit range. Alternatively, the change density-calculating section 11a groups the signal lines within the circuit range into a plurality of groups. By this grouping operation, it is possible to measure sufficient data to calculate an average change density of the circuit range, and generate a measurement circuit having a small number of circuits.

Next, the change density-calculating section 11a embeds the generated measurement circuit data in the test bench 22 (see FIG. 5) of the emulation data 20 to thereby generate the processed test bench 26 (step S22). Further, the change density-calculating section 11a adds a description for extracting the measurement result to the control script 24 to thereby generate the processed control script 27.

Thereafter, the change density-calculating section 11a sends the processed emulation data 25 to the emulator controller 13. Based on the processed emulation data 25, emulation by the emulator 14 is executed under the control of the emulator controller 13 (step S23). As a result of the emulation, measurement result data is generated.

The change density-calculating section 11a processes the generated measurement result data to generate average change density data for each circuit range on a sampling section-by-sampling section basis, as illustrated in FIG. 12 (step S24). In the measurement result data, a sum of signal changes at each observing point in each circuit range is set forth on an observing point-by-observing point basis. Therefore, the change density of the signal per one observing point, i.e. the average change density is determined using the number of observing points included in the circuit range.

By the above-described process, the average change density for each circuit range on a sampling section-by-sampling section basis is calculated.

(Details of Power coefficient Calculation Process)

Next, a detailed description will be given of the process for calculating the power coefficient in the step S13 illustrated in FIG. 7.

Figure 20:
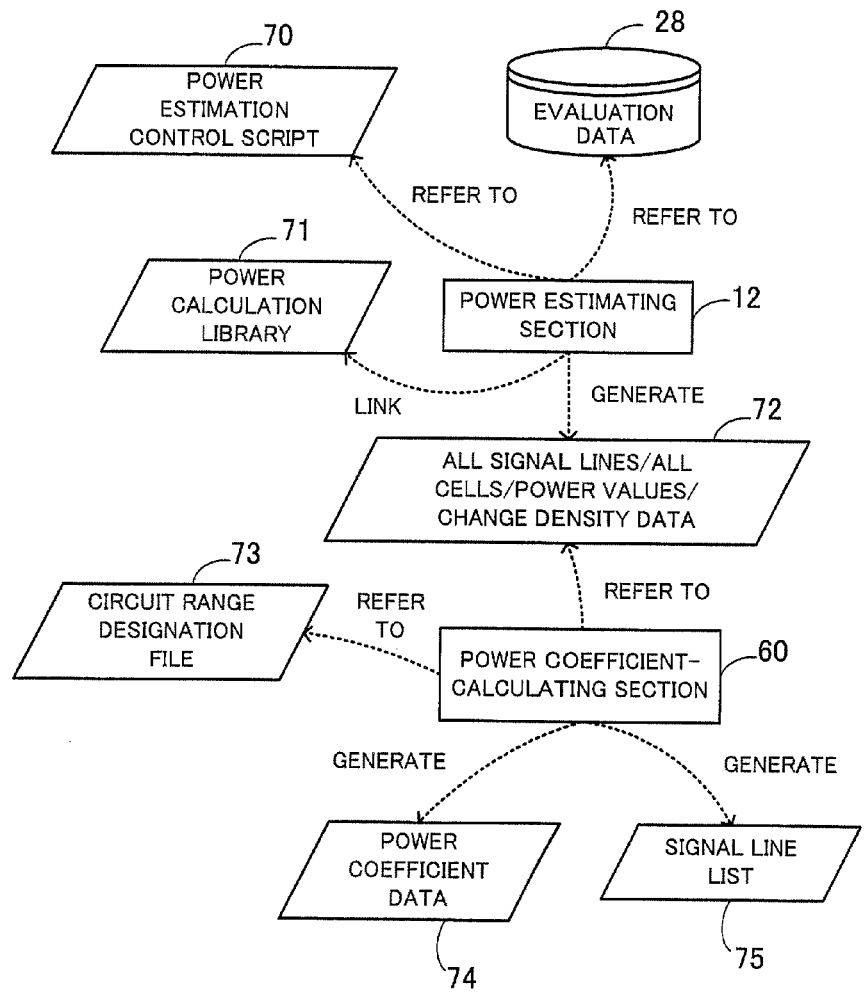
FIG. 20 illustrates a process for calculating a power coefficient.

FIG. 20 illustrates an example of the process for calculating a power coefficient.

A power coefficient-calculating section 60 represents one function included in the power calculating section 11b illustrated in FIG. 4. In FIG. 20, it is assumed that the power estimating section 12 and the power coefficient-calculating section 60 are realized by software, such as a power estimation tool and a power coefficient calculation tool.

The power estimating section 12 refers to the evaluation data 28 and a power estimation control script 70, and estimates power by linking to a power calculation library 71, to thereby generate all signal lines/all cells/power values/change density data 72.

The power estimating section 12 has e.g. functions of searching for a signal line and a cell, and as to a signal line or a cell, found by search, a function of performing setting of a change density and referring to the change density, a function of referring to the power value, and a function of determining whether or not the signal line or the cell belongs to a clock tree.

The power estimation control script 70 is a written procedure for controlling the power estimating section 12. According to instructions of the power estimation control script 70, the power estimating section 12 performs calculation.

The power calculation library 71 is a library of a collection of functions used for the power calculation process. Most of control interfaces for a CAD (computer aided design system) tool conform to a language referred to as the TCL (tool command language) developed for commonality of the control interfaces for the CAD tool. A CAD developer incorporates a TCL interpreter into a CAD tool, and incorporates control commands of the CAD tool into the TCL interpreter.

The TCL language has a description capability equivalent to that of a normal programming language and is also capable of linking to the C/C++ language, which makes it easy to create user-defined commands. The power calculation library 71 has a collection of functions created e.g. using the above-mentioned TCL.

The all signal lines/all cells/power values/change density data 72 is data of power values and change densities associated with all signal lines and power values associated with all cells. Further, the all signal lines/all cells/power values/change density data 72 may have additional data. As the additional data, there may be mentioned, for example, a flag indicative of whether or not a signal line and a cell belong to a clock tree (information which enables determination of whether or not the cell or the signal line is included in a combinational circuit (except the clock tree)). In the present embodiment, it is assumed that "the cell is included in the clock tree" means a case where any of the terminals of the cell is connected to the clock tree.

Figure 21:
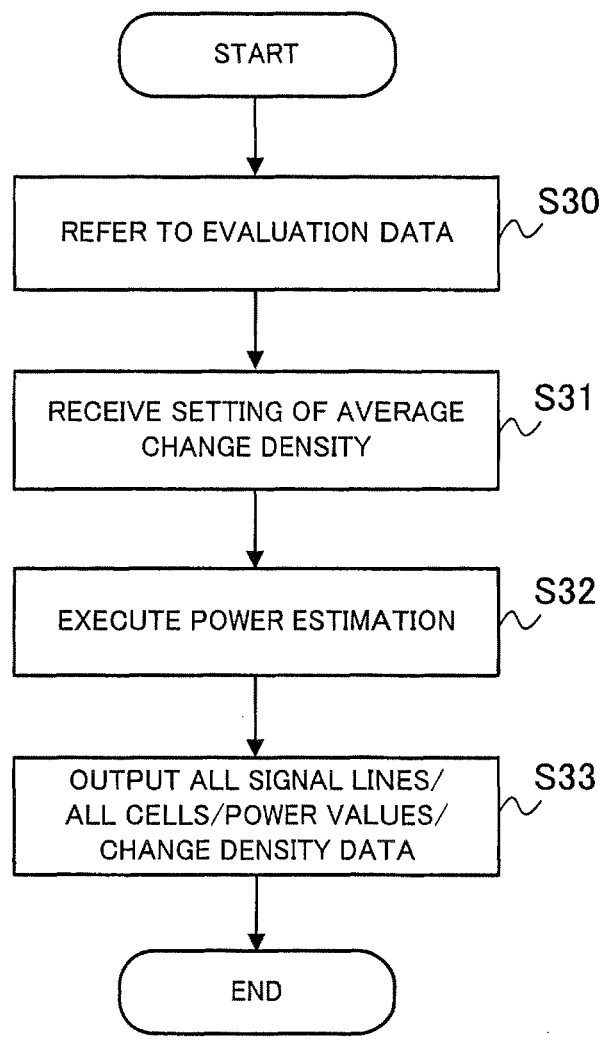
FIG. 21 is a flowchart of an example of operations of a power estimating section.

FIG. 21 is a flowchart of an example of operations of the power estimating section.

According to the description of the power estimation control script 70, the power estimating section 12 performs e.g. the following operations:

The power estimating section 12 refers to the evaluation data 28 (step S30), and for example, receives the setting of the average change densities by the user (step S31). For example, if a command for designating average change densities to be given as arguments to respective signal lines is registered in the power calculation library 71, the power estimating section 12 calls the command in the step S31 in response to an instruction by the user to enable the user to perform configuration as desired.

Next, the power estimating section 12 executes power estimation based on the set average change densities and the referred evaluation data 28 (step S32).

The power value of each signal line is determined, based on the set average change density D1, e.g. by calculating ½×C (load capacity of signal)×V (voltage)$^2$×D1. The load capacity of the signal and the like are acquired from the evaluation data 28.

Further, the power value of each cell can be acquired e.g. from the electric characteristics of each cell described in the technology library 30. In the technology library 30, for example, a power amount E to be consumed when one change in the output from the cell occurs due to a change in a certain input signal is set forth as an item in a table. The item in the table is not limited to one kind. For example, if a cell has two inputs and one output, the technology library 30 includes a table for the cell in which there are set forth a power amount to be consumed when the output is changed by a change in a first input, and a power amount to be consumed when the output is changed by a change in a second input.

The power estimating section 12 calculates the power value of each cell using the above-mentioned table and the set average change density. Then, the power estimating section 12 estimates the overall power value by adding up the power values of all signal lines and all cells.

Then, the power estimating section 12 extracts from the results of power estimation the power values and the change density values of all signal lines and all cells and flags indicative of whether or not associated signal lines and cells are included in the clock tree and outputs the all signal lines/all cells/power values/change density data 72 (step S33).

For example, if a command for extracting the above-mentioned items of information from the result of power estimation and saving the same in a file is registered in the power calculation library 71, the power estimating section 12 calls the command to extract desired information in response to an instruction from the user. This generates all signal lines/all cells/power values/change density data 72, as desired.

When the all signal lines/all cells/power values/change density data 72 is generated by the above-described processing, the power coefficient-calculating section 60 generates power coefficient data 74 from the all signal lines/all cells/power values/change density data 72, and outputs the same.

More specifically, the power coefficient-calculating section 60 sorts the all signal lines/all cells/power values/change density data 72, on a circuit range basis, by referring to a circuit range designation file 73. The power coefficient-calculating section 60 further calculates an average power value for signal lines and cells which do not belong to the clock tree, on a circuit range-by-circuit range basis. Then, the power coefficient-calculating section 60 outputs the name of each circuit range, the calculated power value, and the average change density, as the power coefficient data 74. The power coefficient-calculating section 60 further generates a signal line list 75 which is a list of signal lines to be observed (signal lines which do not belong to the clock tree), and outputs the same.

(Details of Correction Coefficient Calculation Process)

Next, a description will be given of the process for calculating the correction coefficient in the step S14 illustrated in FIG. 7.

Figure 22:
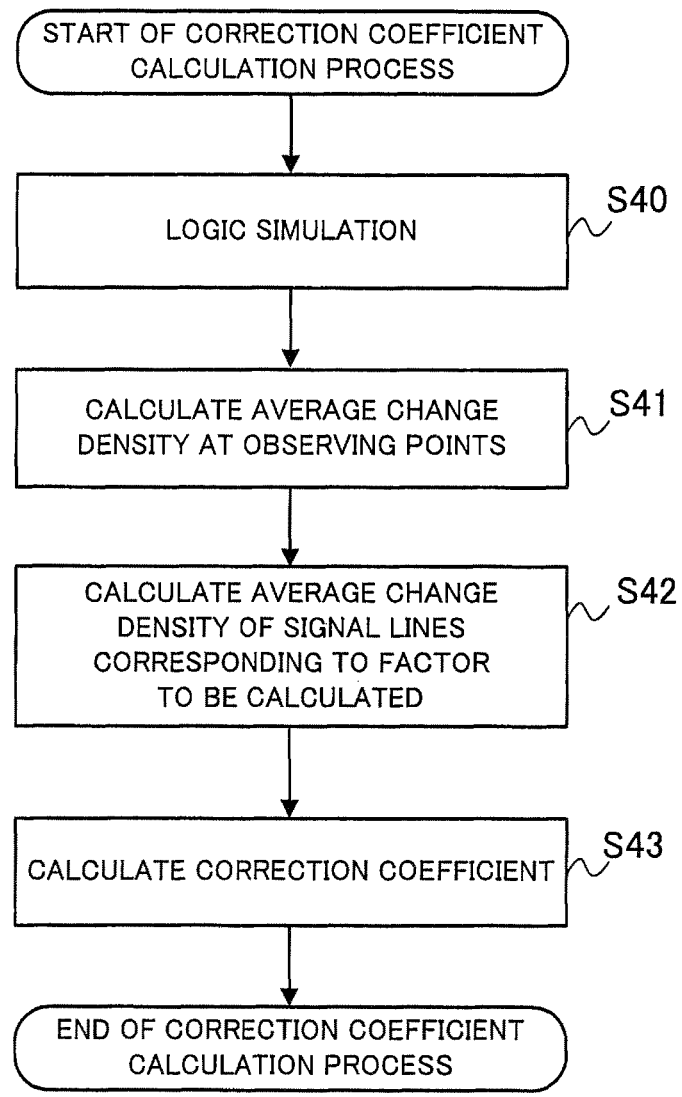
FIG. 22 is a flowchart of a process for calculating a correction coefficient.

FIG. 22 is a flowchart of an example of the process for calculating the correction coefficient.

First, the emulator controller 13 controls the emulator 14 using the emulation data 20 to perform logic simulation (step S40). At this time, the power calculating section 11b acquires waveform data from the emulator 14 via the emulator controller 13.

For example, the power calculating section 11b acquires waveform data for a time period desirable to calculate the correction coefficient (e.g. a time period in which a circuit range to be subjected to the correction coefficient calculation frequently operates). For example, the power calculating section 11b may detect an operation factor of the input data terminal of the flip-flop from the result of simulation to thereby set e.g. a time period in which the operation factor is high as the time period for acquiring the waveform data. Further, the user may empirically set the time period for acquiring the waveform data.

Next, the power calculating section 11b calculates, for each circuit range, an average change density of signals at the observing points included in the circuit range (step S41). In the processing in the step S41, the power calculating section 11b, first, calculates the change density using the acquired waveform data for each signal line included in the above-mentioned signal line list 75. More specifically, the power calculating section 11b determines the number of state changes of each signal from the waveform data, and calculates the number of signal changes/simulation time period to thereby calculate the change density. Next, the power calculating section 11b generates an observing point list for each circuit range using the above-mentioned circuit range designation file 73 and the observing point list generated by the change density-calculating section 11a. Then, the power calculating section 11b averages the change densities of the signals in the signal lines on the observing point list to thereby generate and output an average change density list of the signals at the observing points for each circuit range.

FIG. 23 illustrates an example of the average change density list of signals at the observing points for each circuit range.

The average change density list in FIG. 23 illustrates an example of the average change densities of signals at observing points in each of the circuit ranges A, B, and C.

Next, the power calculating section 11b calculates an average change density of signals of signal lines which belong to a factor to be calculated (here, a combinational circuit) for each circuit range (step S42). In the step S42, the power calculating section 11b, first, creates a list of the signal lines corresponding to the factor to be calculated for each circuit range by referring to the above-mentioned circuit range designation file 73 and the signal line list 75. Then, the power calculating section 11b calculates an average value of change densities of signals of the signal lines corresponding to the factor to be calculated for each circuit range, generates and outputs an average change density list of the signals of the signal lines corresponding to the factor to be calculated for each circuit range.

FIG. 24 illustrates an example of an average change density list of signals of signal lines corresponding to a factor to be calculated for each circuit range.

The example of the average change density list illustrated in FIG. 24 illustrates an example of the average change density of signals of the signal lines corresponding to the factor to be calculated for each of the circuit ranges A, B, and C. The average change density list illustrated in FIG. 24 differs from the average change density list of the signals at the observing points illustrated in FIG. 23 in the values of the average change density in the circuit ranges A, B, and C.

Next, the power calculating section 11b calculates the correction coefficient (step S43). The power calculating section 11b determines a ratio of an average change density of signals of signal lines corresponding to the factor to be calculated to an average change density of signals at the observing points, for each circuit range.

In the examples illustrated in FIGS. 23 and 24, in the circuit range A, the average change density of signals at the observing points is 7.5 [mega signal changes/second], and the average change density of the signals of the signal lines corresponding to the factor to be calculated is 8 [mega signal changes/second], and hence a correction coefficient 8/7.5≈1.06 is obtained. Similarly, a correction coefficient 7/7=1 is obtained for the circuit range B, and a correction coefficient 4/3.5≈1.14 is obtained for the circuit range C.

By using the correction coefficient thus obtained on a circuit range-by-circuit range basis, the power calculating section 11b can calculate the power value for each circuit range on a sampling section-by-sampling section basis, as illustrated in FIGS. 17 and 18.

The power calculating section 11b may reuse correction coefficients calculated by the above-mentioned method in the past, which is stored in the storage device 15, or may be configured to use correction coefficients designated by being input from the user based on his experience.

Further, the power calculating section 11b may determine power coefficient data from a result of actual estimation of power.

Note that although in the above-described example, the waveform data is acquired using the emulator 14, the waveform data may be acquired by software logic simulation, or by block-level logic simulation. For example, the power calculating section 11b may calculate an average change density of signals at signal lines in the designated circuit range based on the output waveform data from the software logic simulator. Further, when the time period desirable for acquiring the waveform data is different between the circuit ranges, the power calculating section 11b may acquire waveform data of a plurality of time periods.

Further, although in the above description of the second embodiment, for convenience' sake of explanation, overlapping processes are described in a plurality of steps, these processes may be collectively executed.

The evaluation data 28 illustrated in FIG. 5 may be based on prototype data which is created in an initial stage of the layout. In designing a layout, first, the number of circuits is grasped and a layout design is planned, and hence layout designing is sometimes performed using data on which operation verification has not been sufficiently performed and with which the operation may be not normal. Even data (data of a prototype) obtained when the layout design is underway (before completion) can be used as the evaluation data 28 when the power calculating section 11b calculates power coefficients, since the layout being designed is similar in wiring capacity and circuit configuration to those of the completed layout.

The prototype is designed in a relatively early stage of designing, and hence it is possible to estimate power using wiring capacity data based on the result of actual layout designed by the layout tool in the early stage of the designing, similarly to the above.

Further, although the above description is given of the case where a sampling time period for power estimation is designated by the user, the change density-calculating section 11a may dynamically change the sampling time period. The change density-calculating section 11a, for example, observes operating conditions of simulation (e.g. whether or not a specific bit of a counter of the measurement circuit assumes a value of 1) using a script or the like. Then, the change density-calculating section 11a, for example, performs modification, such as reduction of the sampling time period, for a time zone in which the circuit frequently operates (see FIG. 11). This makes it possible to control the sampling time period suitable for power estimation for a long time period, such that detailed power estimation is performed in a short sampling time period in a time zone in which power consumption is large, whereas in a time zone in which power consumption is small, power is estimated in a wide sampling time period.

Further, although in the above description, the same correction coefficient is used for calculating a power value in each sampling time period, the correction coefficient may be updated, for example, by performing the process as illustrated in FIG. 22 for each sampling time period or each desired time.

EXPERIMENTAL EXAMPLE 1

Hereafter, a description will be given of a result of applying the electrical power-estimating method according to the present embodiment to actual design data of a circuit to be evaluated having a several mega gate size (hereinafter referred to as the design data A).

Considering that the present design is related to a synchronous design, the flip-flops are likely to appear relatively at regular intervals in any path within each combinational circuit. Therefore, it is considered that signals input and output to and from the data terminals of the flip-flops are typical signals of the combinational circuit. Further, the number of signal changes at an input data terminal is larger than that at an output data terminal. For this reason, as mentioned in the above embodiment, also in the following experiment, the observing points are set to the input data terminals of flip-flops.

FIG. 25 illustrates the numbers of generated measurement circuits and respective ratios of areas of the measurement circuits to an area of an evaluated circuit (ratios of increase).

FIG. 25 illustrates the numbers of generated measurement circuits, and the respective ratios of areas of the measurement circuits to the area of the evaluated circuit (ratios of increase) in respective three cases where the number of signal changes is measured by a counter in a state where the sampling time period is equal to 10 μs and the number of samples is equal to 30,000.

Case 1 shows, by way of example, a case where a block of the design data A having a hierarchical structure ranging from a module at a top layer (top module) to three-layer depth is set as a circuit range and a measurement circuit is applied which performs measurement with a counter after dividing signal lines into groups each consisting of 1,024 signal lines at the maximum. In Case 1, assuming that part of the circuit for measuring each group is one measurement circuit, the number of measurement circuits is approximately 1,097 and the rate of increase in this case is 56%.

Case 2 shows a case where the circuit range is set by designating a path only to a block on which power estimation is desired and measurement is performed after dividing the signal lines into groups each consisting of 1,024 signal lines at the maximum. In Case 2, for example, the number of measurement circuits is reduced to approximately 350, and the rate of increase in this case is 52%.

Case 3 shows a case where the circuit range is set by designating a path only to a block on which power estimation is desired and measurement is performed by dividing the signal lines into groups each consisting of 8,096 signal lines at the maximum. In Case 3, for example, the number of measurement circuits is reduced to approximately 85, and the rate of increase in this case is 51%.

When it is assumed that the sampling time period is equal to 10 μs, and the number of samples is equal to 30,000, the simulation time period is equal to approximately 300 ms, which is short.

Assuming that the simulation time period is set to 30 seconds, the simulation time period becomes 100 times longer than the above three cases, so that the number of bits of the counter for counting the number of signal changes during this simulation time period increases by seven bits. In Case 3, when the simulation time period is 300 ms, the number of bits of the counter is 28 bits, and hence when the simulation time period is increased to 30 seconds, the number of bits of the counter becomes equal to 35 bits, which increases the number of circuits by approximately 25%.

However, in Case 3, approximately 99% of the circuit is circuit part for calculating the number of changes per one cycle. Therefore, an increase in counter part of the circuit can be ignored. Further, this value includes the flip-flops for observing (approximately 14%), and hence if the flip-flops for observing are ignored, the rate of increase is approximately 44% to 48% because the number of circuits of non-counter part of the circuit is proportional to the number of observing points.

As described above, according to the power estimation method of the present embodiment, it is possible to largely reduce the area of a measurement circuit, which has been conventionally several times to ten times or more larger than the area of an evaluated circuit.

Further, for the following reason, it is possible to reduce the amount of data for power estimation.

In Case 3, since the maximum value of the number of bits of the counter is 28, one word is equal to four bytes. When the number of measurement circuits is 85, an area for storing one sample is 128 words. Since the number of samples is 30,000, the data amount of the measurement result is 4×128×30, 000=15.4 megabytes. In Case 1, the data amount of the measurement result is 4×2,048×30,000=264 megabytes.

When the sampling time period is one ms, one word is equal to five bytes in Case 3, and the data amount of the measurement result increases by 25%. In Case 1, since one word is equal to 32 bits, the data amount of the measurement result does not change. Therefore, in any case, the data amount of the measurement result becomes not larger than 300 megabytes.

Further, it is also possible to reduce the data amount of waveform data to be acquired. When the simulation time period is 300 ms, the data amount of waveform data which is obtained by simulation on the design data A is approximately two gigabytes. 300 ms is long enough to create correction coefficients.

As described above, although in the conventional techniques (e.g. in Japanese Laid-open Patent Publication No. 2002-288257, and Japanese Laid-open Patent Publication No. 02-171861), the data amount of power estimation is in the order of terabyte, in the present embodiment, the data amount can be reduced to the order of several gigabytes.

Further, according to the present embodiment, it is possible to perform power estimation within a short time period as described hereinafter.

In the steps S41 and S42 illustrated in FIG. 22, a process for analyzing waveform data and thereby calculating a change density for each signal is executed. When the power calculating section 11b which executes this process is realized using Ruby 1.9 which is a script language, it takes approximately two minutes to execute the process for 4,930 samples, and it takes approximately twelve minutes to execute the process for 30,000 samples.

Further, it takes the power estimating section approximately five minutes to execute a process for calculating power from change density data of each signal line, for 4,930 samples, and it takes approximately 28 minutes to execute this process, for 30,000 samples.

Therefore, in the case of 30,000 samples, the power estimating process is completed in approximately 40 minutes. As described above, the process which cannot be conventionally finished within a practical time period can be finished within an hour. This is a great improvement.

In the calculation by the power estimating section 12, it is only necessary to once execute the process for calculating power from the change density data of each signal line, and hence it is possible to finish the calculation within a short time period.

Further, in the steps S41 and S42 illustrated in FIG. 22, for example, the observing points are set e.g. to the input data terminals of the flip-flops, so that it is not necessary to observe a lot of observing points, and hence it is possible to calculate the average change density within a practical time period.

Next, a description will be given of a result of evaluation of accuracy in power estimation in the present embodiment. To check the accuracy in power estimation, the following experiment was carried out:

(1) The power calculating section 11b selects points where a change occurs in power of a main block based on the result of the past power estimation on the design data A, and acquires waveform data of 10 μs×30 samples.

(2) The power calculating section 11b calculates power coefficients and an average change density in the designated circuit range. Note that to compare the accuracy, it is assumed that even the blocks of the design data A have an inclusion relation as expressed by A.B0 (block B0 is within block A), the power calculating section 11b calculates a power coefficient and an average change density at the observing points of the entire block A.

(3) The power calculating section 11b calculates a power value in a case where the correction coefficient is to 1, based on the result of (2).

A power value at each signal line is calculated from the waveform data acquired by the logic simulation in which the number of samples is set to 30, further, a power value at each cell is calculated, and a power value calculated by adding up these power values is used as a comparative example.

Further, in this experiment, it is assumed that samples in which the power value is not smaller than 0.05 mW are used as valid samples.

Figure 26:
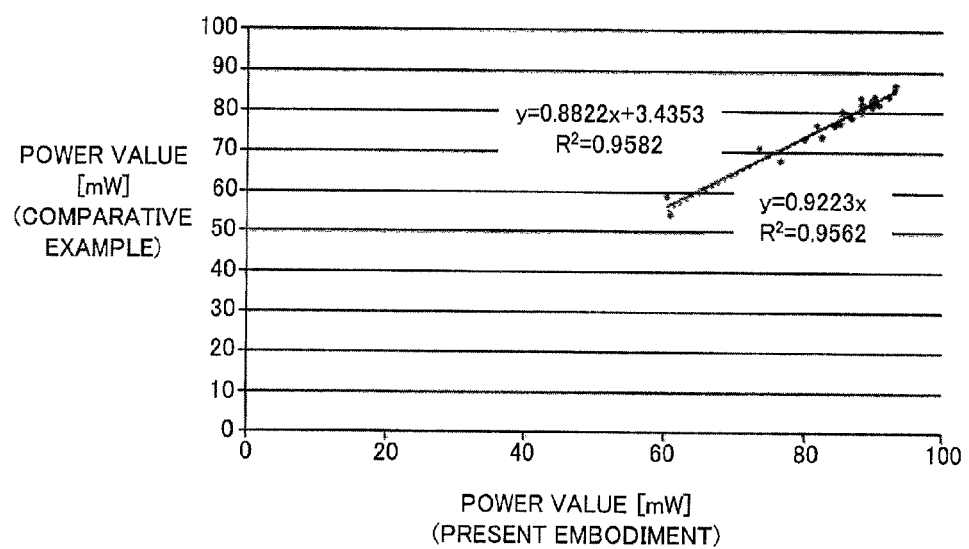
FIG. 26 illustrates a correlation between power values calculated by the power estimator according to the present embodiment and power values of a comparative example.

FIG. 26 illustrates a correlation between power values calculated by the power estimator according to the present embodiment and power values of the comparative example.

FIG. 26 illustrates a correlation chart of the entire chip. The horizontal axis represents the power value mW calculated by the power estimator 10 according to the present embodiment, and the vertical axis represents the power value mW of the comparative example. Dots in FIG. 26 each represent a sampling point. Solid and dotted straight lines represent linear approximations.

The solid straight line is expressed by y=0.8822x+3.4353. The dotted straight line is expressed by y=0.9223x. $R^2$ is a coefficient of determination. In general, it is said that when $|R|≥0.7$, this indicates a strong correlation. Here, assuming that it is only necessary to satisfy $|R|≥0.9$, the coefficient of determination $R^2≥0.8$ is used as a reference.

The coefficient of determination is calculated using a LinEst function of Microsoft Excel (registered trademark) 2007. Due to specification of the LinEst function, an intercept cannot be fixed to zero, and hence calculation is performed using a solid straight line of which the intercept is confirmed to be small by rough estimation. The solid straight line gives a value of $R^2=0.9582$, which is approximately equal to a coefficient of determination $R^2=0.9562$ given by the dotted straight line of which the intercept is equal to 0.

Figure 27:
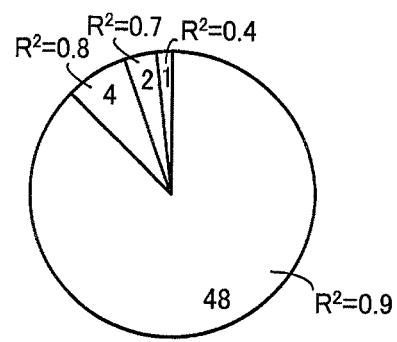
FIG. 27 illustrates a result of calculation of a coefficient of determination for each block in a design data A.

FIG. 27 illustrates results of calculation of the coefficient of determination in the blocks within the design data A.

Each numeral in a circle graph represents the number of blocks. As illustrated in FIG. 27, approximately 94% of the blocks has a coefficient of determination of $R^2≥0.8$, which satisfies the reference value. A block having a coefficient of determination of 0.4 has many more circuits inserted at a latter stage of designing, such as a test stage, than those of user-designed part, and hence it should have been treated as an exception. A block having the larger power (hereinafter referred to as the block P) of two blocks having a coefficient of determination of an order of 0.7 is formed by two sub blocks, and each sub block has a coefficient of determination not smaller than 0.9. These sub blocks are different from each other in correction coefficient, which made the coefficient of determination on the order of 0.7. Therefore, if circuit ranges are appropriately designated, it is possible to perform accurate power estimation. The other of the two blocks is not analyzed because its power is very small.

As mentioned above, although the sub blocks of the block P have a coefficient of determination of an order of 0.9, power in the upper block is calculated using power in the sub blocks, and hence by using a correction coefficient, an appropriate power value of the block P can be determined.

Further, if the signals at the observing points in the object circuit range are operating to a certain degree during calculation of a correction coefficient using the waveform data, it is possible to determine a more appropriate correction coefficient, whereby it is possible to ensure accurate power estimation.

Figure 28:
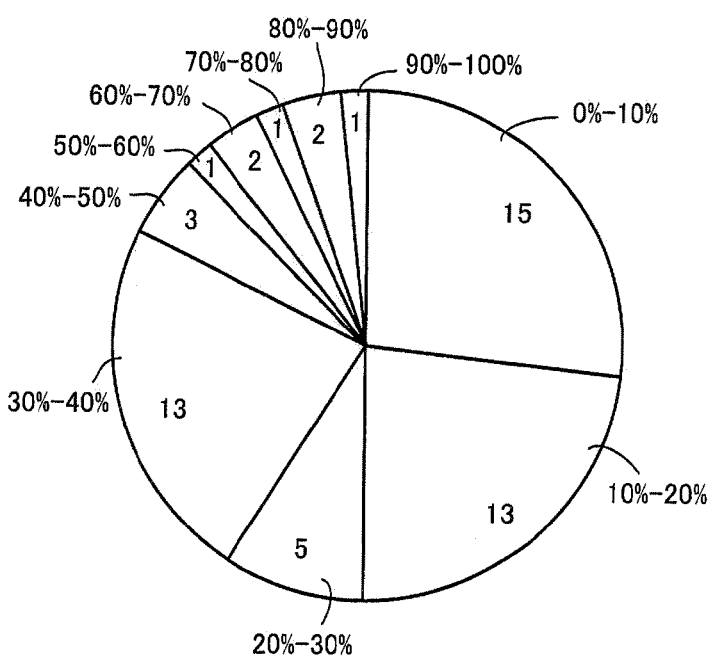
FIG. 28 illustrates errors between the power value calculated by the power estimator according to the present embodiment and the power value of the comparative example.

FIG. 28 illustrates errors between power values calculated by the power estimator according to the present embodiment and power values of the comparative example. Each numeral in a circle graph represent the number of blocks.

Note that this data represents a case where the correction coefficient is set to 1 (i.e. assuming that the average change density of signals at observing points is equal to the average change density of the signals at all signal lines of the factor to be calculated). As illustrated in FIG. 28, approximately 80% of the blocks have an absolute value error of not larger than 40%, and all of the blocks have an absolute value error of not larger than 100%.

The fact that the coefficient of determination is good indicates that points from which waveform data are obtained have a high degree of freedom. Even if the number of points in which power is estimated using waveform data is reduced, the accuracy of power estimation is less liable to be degraded. Therefore, the power estimation using waveform data has a low risk of accuracy degradation due to an increase of time for power estimation.

Figure 29:
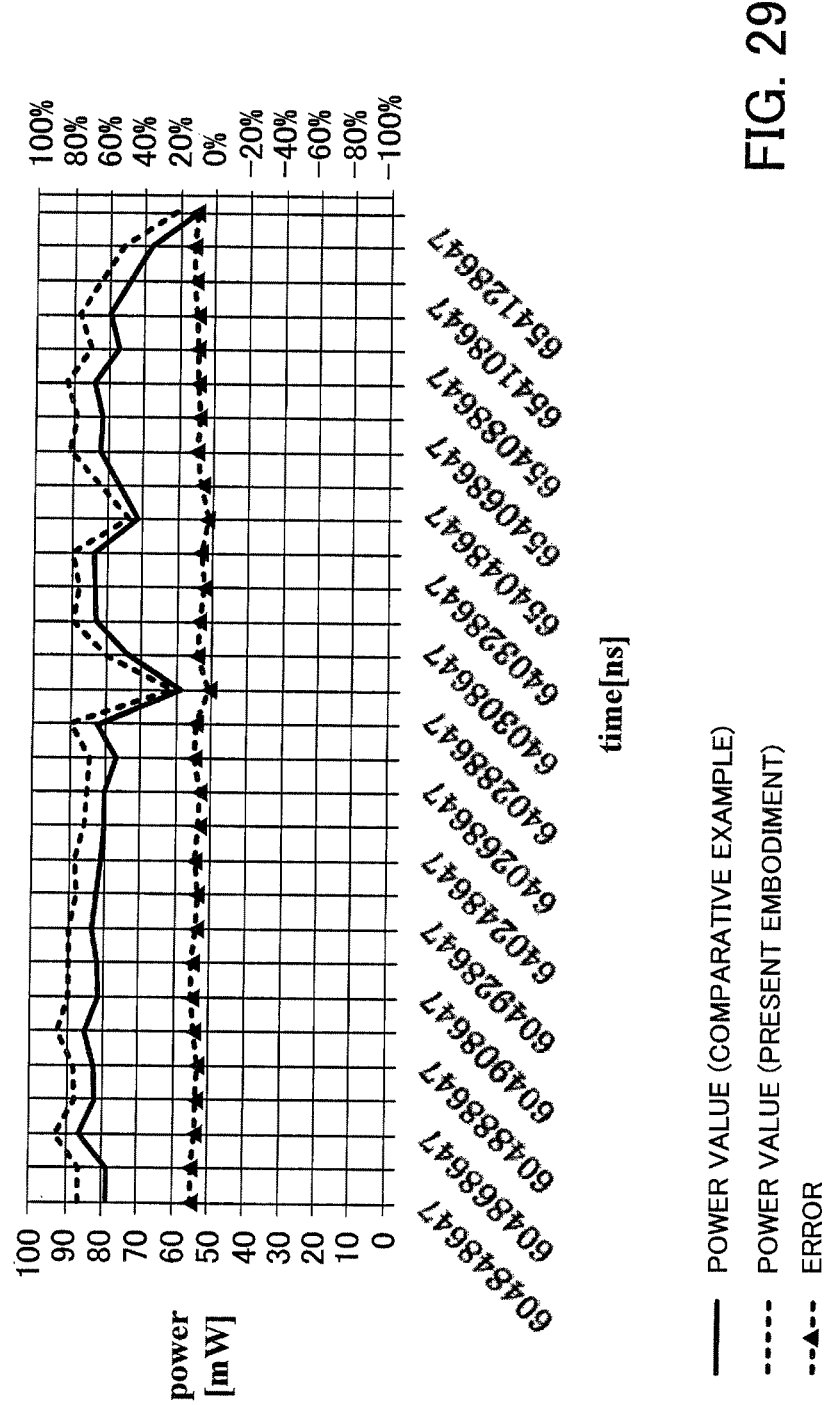
FIG. 29 illustrates errors between power values calculated by the power estimator according to the present embodiment and power values of the comparative example, during a simulation time period.

FIG. 29 illustrates errors between power values calculated by the power estimator according to the present embodiment and corresponding power values of the comparative example, during a simulation time period.

The horizontal axis represents time [ns], and the vertical axis represents the power value [mW] and the error [%]. As illustrated in FIG. 29, even if time elapses, the error is maintained at a low level.

As described above, the power value calculated by the power estimator 10 according to the present embodiment has a strong correlation with the power value given as the comparative example. Therefore, according to the power estimation method executed by the power estimator 10 of the present embodiment in which the observing points are applied to the input data terminals of the flip-flops, it is possible to expect sufficient accuracy in power estimation. Therefore, although there is conventionally a possibility that the accuracy of power estimation is reduced when the number of signals to be observed is largely reduced, the power estimation method executed by the power estimator 10 according to the present embodiment can quantitatively prove high accuracy of the estimation, as described above.

Further, although the correction coefficient is set to 1 in the present experimental example, if it is possible to set an appropriate correction coefficient by the process illustrated in FIG. 22, effectiveness of the power estimation is further improved.

Although in the above experimental example, the input data terminals of the flip-flops are set as the observing points, similarly to the input data terminals, the output data terminals of the flip-flops also have a high matching property in voltage value with the comparative example. It is easy to observe signal changes of output data terminals also in RTL design data. Therefore, the output data terminals of flip-flops are also promising candidates of the observing points.

As described above, the power estimator 10 and the power estimation method according to the present embodiment make it possible to accurately estimate power at high speed even for a large-scale circuit for a long time period, even when the factor to be calculated includes a lot of signal lines, as in a combinational circuit.

EXPERIMENTAL EXAMPLE 2

In the above-described Experimental Example 1, when the block having a coefficient of determination of 0.4 was analyzed, it was found that the block has a circuit structure described below.

Figure 30:
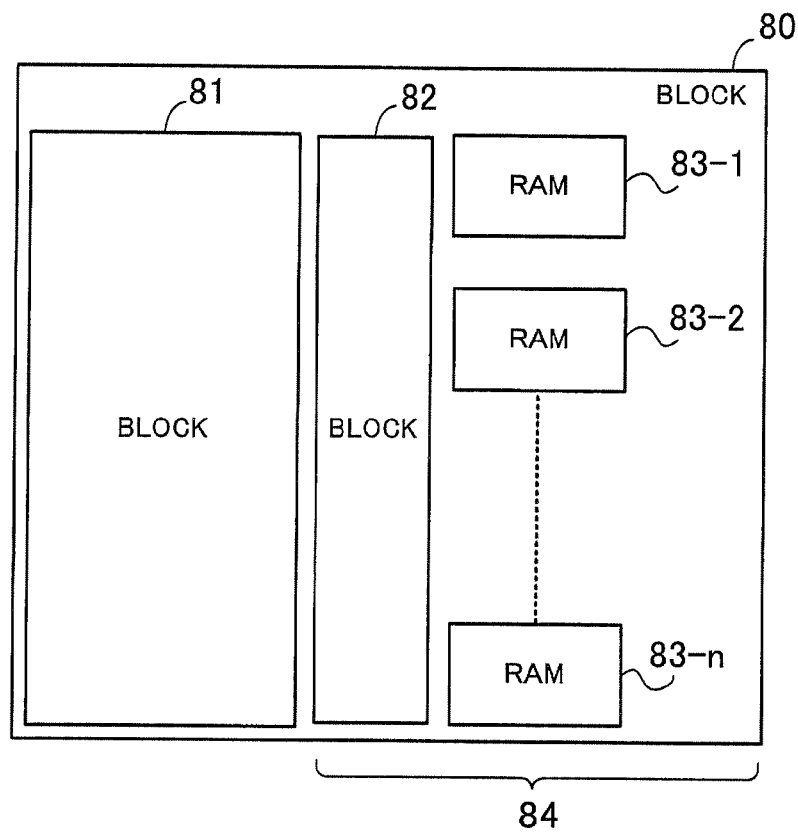
FIG. 30 illustrates an example of a circuit structure of a block having a small coefficient of determination.

FIG. 30 illustrates an example of the circuit structure of a block having a small coefficient of determination.

A block 80 includes blocks 81 and 82, and RAMs 83-1, 83-2, . . . , and 83-n, as sub blocks. The block 81 is a representative block within the block 80, and the coefficient of determination of this part is 0.91. When circuit part of the block 80 other than the block 81 (hereinafter referred to as the circuit part 84) was investigated, it was found that the circuit part includes lots of repeater buffers, test circuits, circuits for selecting between data output lines of a plurality of RAMs, and so forth. The number of logic circuits within the circuit part 84 is approximately equal to that of the block 81. However, flip-flops included in the circuit part are flip-flops and setting registers inside test circuits, and the like, and there are no flip-flops which have a correlation with change densities of signals of signal lines (not illustrated) between the block 81 and the RAMs 83-1 to 83-n.

Therefore, it cannot be said that signals input to the input data terminals of the flip-flops in the circuit part 84 are typical signals indicative of an electrical power tendency of the circuit part 84, and hence the signals are not suitable for being employed as observing points for estimating power.

Figure 31:
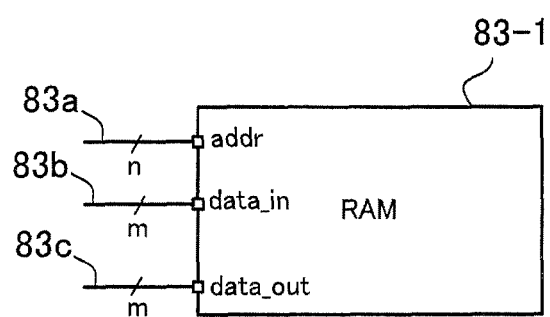
FIG. 31 illustrates another example of the observing points.

In view of this, as observing points of the circuit part 84, there are employed the following:

FIG. 31 illustrates another example of the observing points.

The RAM 83-1 includes an address terminal addr connected to an n-bit address line 83a, an input data terminal data_in connected to an m-bit data input line 83b, and an output data terminal data_out connected to an m-bit data output line 83c.

Theses terminals are employed as the observing points. Although the RAM 83-1 further includes other terminals to which a chip enable signal, a write enable signal, a clock signal, and so forth are input, respectively, those terminals are not set as observing points. As to the other RAMs 83-2 to 83-n as well, the address terminal, the input data terminal, and the output data terminal are set as observing points.

Figure 32:
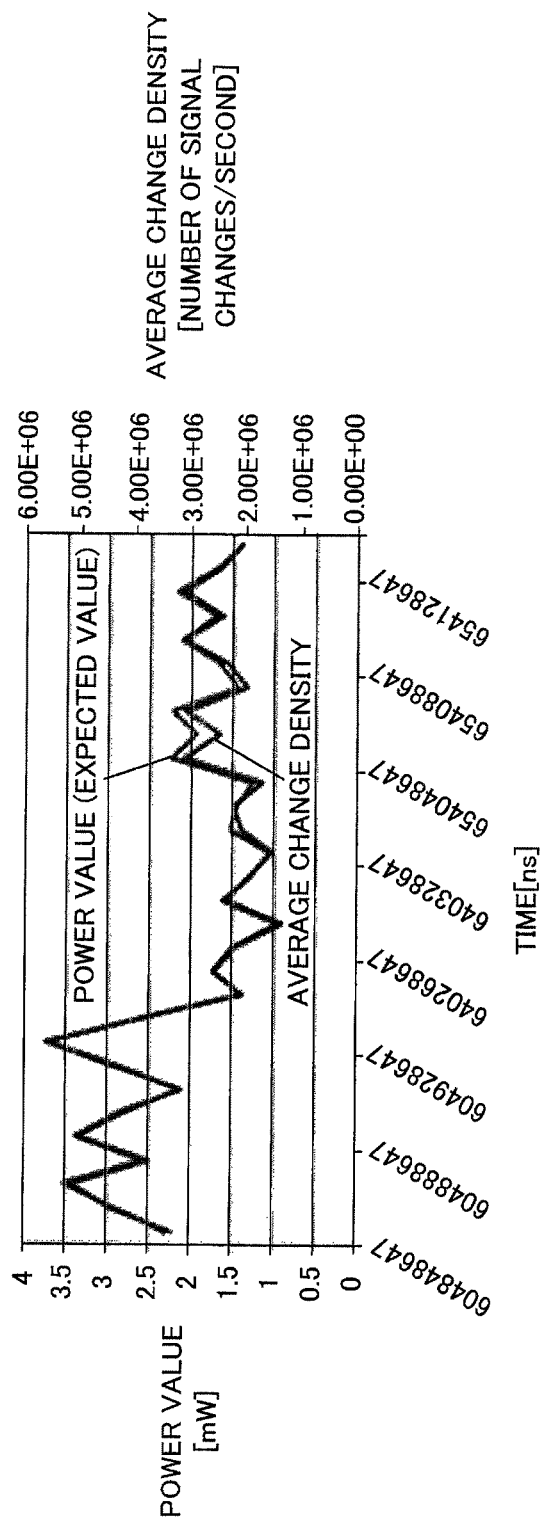
FIG. 32 illustrates an example of calculation of an average change density of signals at address terminals, input data terminals, and output data terminals of a RAM.

FIG. 32 illustrates an example of calculation of an average change density of signals at the address terminals, input data terminals, and output data terminals of RAMs.

In FIG. 32, there is illustrated an example of the calculation of the average change density of signals at the address terminals, input data terminals, and output data terminals of the RAMs 83-1 to 83-n illustrated in FIG. 30. Further, there is illustrated an expected value of power in the circuit part 84 (result of power estimation using all of the signal lines of the circuit part 84) in FIG. 30.

The horizontal axis represents time [ns], the left vertical axis represents the power value [mW], and the right vertical axis represents the average change density [the number of signal changes/second].

The average change density of signals at the address terminals, input data terminals, and output data terminals of the RAMs 83-1 to 83-n has an excellent correlation with the expected value of power in the circuit part 84 as illustrated in FIG. 32.

Figure 33:
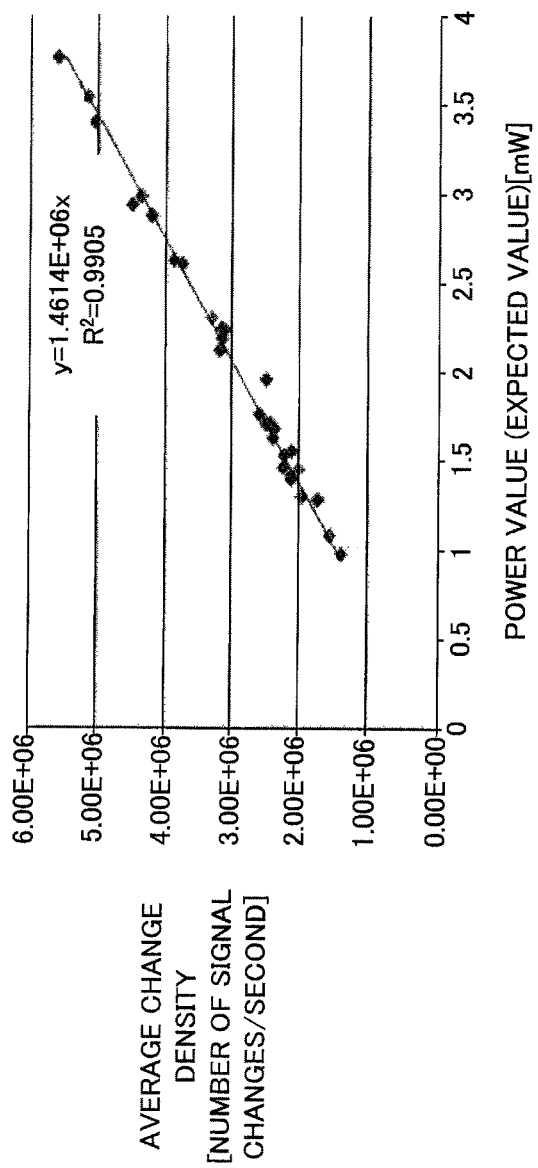
FIG. 33 illustrates an example of a correlation between the average change density of the signals at the address terminals, input data terminals, and output data terminals of the RAM, and an expected value of power.

FIG. 33 illustrates an example of a correlation between the average change density of signals at the address terminals, input data terminals, and output data terminals of the RAMs, and the expected value of power.

The horizontal axis represents the expected value of power [mW], and the vertical axis represents the average change density of signals at the address terminals, input data terminals, and output data terminals of the RAMs 83-1 to 83-n. Dots in FIG. 33 each represent a sampling point. A solid straight line represents a linear approximation.

Assuming that the horizontal axis represents x, and the vertical axis represents y, this straight line is expressed by $y=1.4614\times10^6 x$. The coefficient of determination $R^2$ calculated using a linear approximation curve drawing function of a graph tool of Microsoft Excel (registered trademark) 2007 is approximately 0.99. That is, the average change density of the signals at the address terminals, input data terminals, and output data terminals of the RAMs 83-1 to 83-n provides data excellently indicative of the electrical tendency of the circuit part 84.

In view of this, in the step S20 in FIG. 19, for a block (e.g. the circuit part 84 in FIG. 30) which includes a lot of RAMs, the change density-calculating section 11a selects the address terminals, input data terminals, and output data terminals of the RAMs, as the observing points.

For example, the change density-calculating section 11a selects observing points according to a ratio of the number of RAMs to the number of flip-flops and the capacities of RAMs in a certain block which is a certain circuit range. For example, if a certain block contains RAMs the number of which exceeds a predetermined ratio to the number of flip-flops, the change density-calculating section 11a selects the address terminals, input data terminals, and output data terminals of the RAMs as the observing points in the block. If not, the change density-calculating section 11a selects the input data terminals of the flip-flops as observing points in the block.

By selecting the observing points as above, and performing power estimation, even when the block 80 as illustrated in FIG. 30 exists, it is possible to accurately estimate power.

By the way, RAMs are not necessarily designed to be collectively arranged in a certain block as illustrated in FIG. 30. For example, RAMs are sometimes arranged in the following manner.

Figure 34:
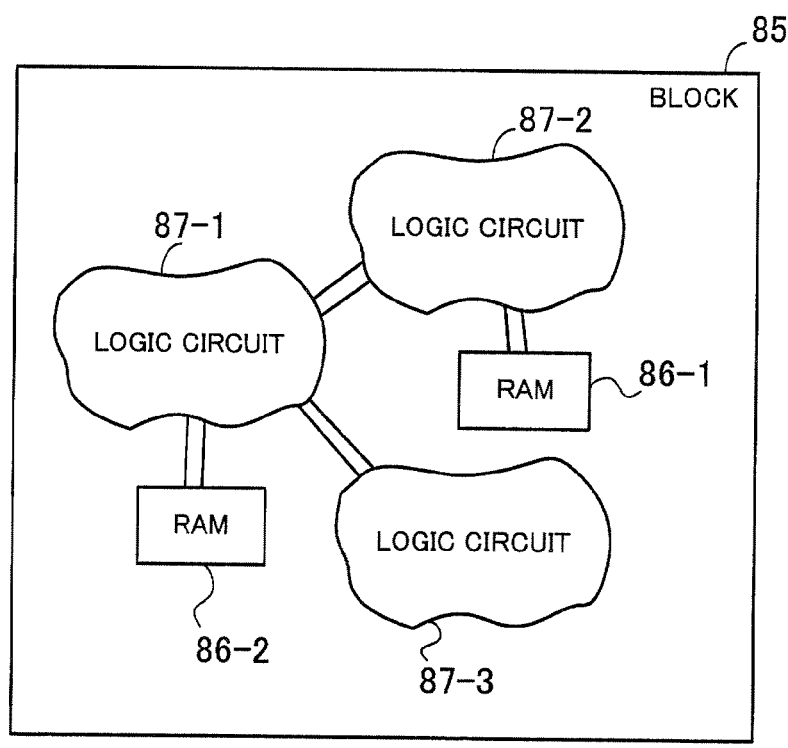
FIG. 34 illustrates an example of a block including RAMs.

FIG. 34 illustrates an example of a block including RAMs.

A block 85 includes RAMs 86-1 and 86-2, and logic circuits 87-1, 87-2, and 87-3. The RAM 86-1 is connected to the logic circuit 87-2, the RAM 86-2 is connected to the logic circuit 87-1, and the logic circuit 87-1 is connected to the logic circuits 87-2 and 87-3.

In the case of the block 85 configured as above, it is impossible to simply divide the block 85 into the representative block 81 and the other circuit part 84, as in the case of the block 80 illustrated in FIG. 30. Therefore, to perform accurate power estimation even on the block 85, there is carried out the following study.

Inputting and outputting of data to and from the RAMs 86-1 and 86-2 as illustrated in FIG. 34 are, in actuality, often partitioned by the flip-flops within the logic circuits 87-1 and 87-2 while taking into account the layout design.

Figure 35:
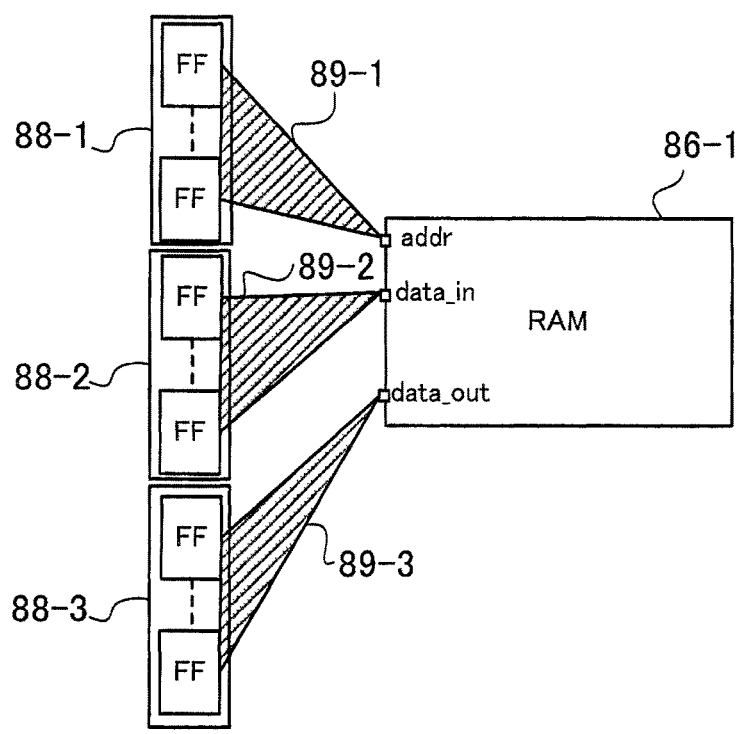
FIG. 35 illustrates an example of a range on which a RAM has a dominant influence.

FIG. 35 illustrates an example of a range on which the RAM has a dominant influence.

For example, the ranges on which the RAM 86-1 has a dominant influence include the following ranges: The first one is a logic area (hereinafter referred to as the logic cone) 89-1 between an address terminal addr of the RAM 86-1 and a nearest one 88-1 of flip-flop groups of the logic circuit 87-2 illustrated in FIG. 34.

The second one is a logic cone 89-2 between the input data terminal data_in and a nearest one 88-2 of the flip-flop groups of the logic circuit 87-2.

Further, the third one is a logic cone 89-3 between the output data terminal data_out and a nearest one 88-3 of the flip-flop groups of the logic circuit 87-2.

The logic circuit 87-2 includes cells disposed outside the logic cones 89-1 to 89-3, for controlling the RAM 86-1, and a lot of cells, such as repeater buffers, disposed within the logic cones 89-1 to 89-3, which have influence on changes in address input to the RAM 86-1 and data input to the same or output from the same.

Figure 36:
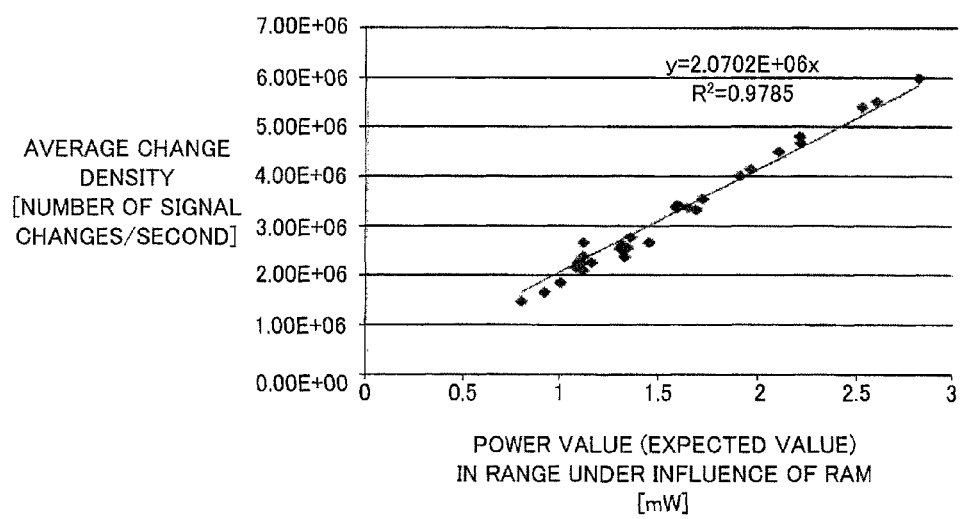
FIG. 36 illustrates an example of a correlation between the expected value of power in the range on which the RAM has a dominant influence and the average change density of signals at an address terminal, an input data terminal, and an output data terminal of the RAM.

FIG. 36 illustrates an example of a correlation between the expected value of power in a range on which a RAM has a dominant influence and the average change density of signals at the address terminal, input data terminal, and output data terminal of the RAM.

The horizontal axis represents the expected value [mW] of power in a range under the influence of the RAM (e.g. the logic cones 89-1 to 89-3 in FIG. 35). The vertical axis represents the average change density [the number of signal changes/second] of signals at the address terminal, input data terminal, and output data terminal of the RAM.

Dots in FIG. 36 each represent a sampling point. A straight line represents a linear approximation. Assuming that the horizontal axis represents x and the vertical axis represents y, this straight line is expressed by $y=2.0702\times10^6 x$. The coefficient of determination $R^2$ calculated using the above-mentioned linear approximation curve drawing function is approximately 0.98.

That is, it is possible to obtain a result which is favorably comparable to the result (the coefficient of determination $R^2$ is approximately 0.99) of investigation of the correlation between the expected value of power in the circuit part 84 illustrated in FIG. 30 and the average change density of the signals at the address terminal, input data terminal, and output data terminal of the RAM.

Therefore, in the step S10 in FIG. 7, the change density-calculating section 11a divides a designated circuit range into such a range on which a RAM has a dominant influence as indicated by the above-mentioned logic cones and the other range, and generates different circuit range designation files.

Then, in the step S20 in FIG. 19, for a circuit range under the influence of a RAM, which is partitioned from a designated circuit range, the change density-calculating section 11a selects the address terminal, input data terminal, and output data terminal of the RAM as the observing points. As for the other circuit range, the change density-calculating section 11a selects e.g. the input data terminals or the output data terminals of flip-flops as the observing points as mentioned above.

This makes it possible to accurately estimate power even when there are a lot of circuit ranges under the influence of RAMs.

Further, even when a circuit is not so designed that RAMs are disposed in a concentrated manner as illustrated in FIG. 30, it is possible to accurately estimate power by taking into account influence of RAMs.

Figure 37:
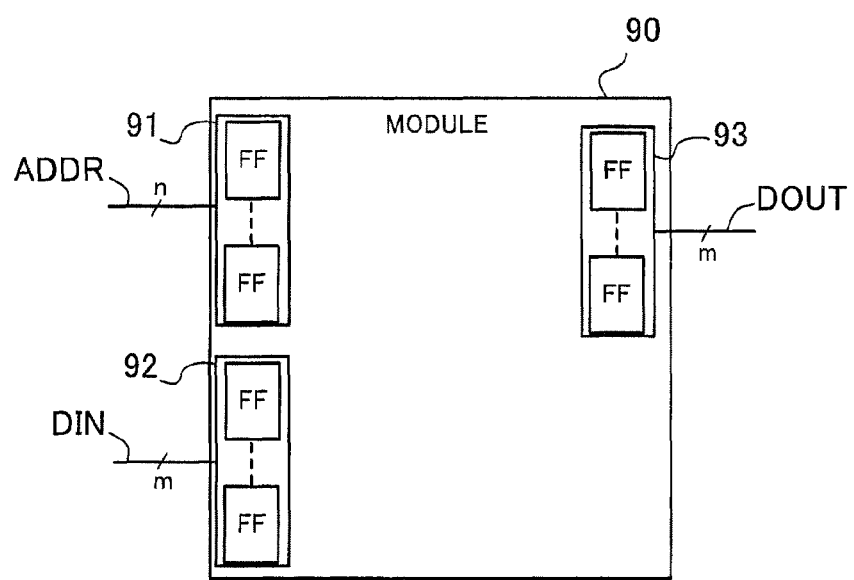
FIG. 37 is an example of a RAM modeled by a module including a plurality of flip-flops.

By the way, considering that each RAM also operates in synchronism with a clock signal, similarly to a flip-flop, the RAM may be treated as a module including a plurality of flip-flops as follows:

FIG. 37 is an example of a RAM formed into a model by a module including a plurality of flip-flops. In this modeling, the RAM is modeled by a circuit in which input data is received by a register, and output data is delivered by using the output of a register. This is because there ought to be a restriction of synchronous design between the flip-flops and the RAM, and hence it is assumed that the RAM can be regarded as illustrated in FIG. 37. If this assumption is right, the address terminal, input data terminal, and output data terminal of a RAM can be regarded as the input data terminals and output data terminals of flip-flops. That is, the terminals of the RAM can be handled in the same manner as the flip-flops. Therefore, it has been investigated by experiment whether or not this assumption is valid. Hereafter, a description will be given of the result.

A module 90 includes a flip-flop group 91 connected to an n-bit address line ADDR, a flip-flop group 92 connected to an m-bit data input line DIN, and a flip-flop group 93 connected to an m-bit data output line DOUT.

In the module 90, the address terminal of the RAM is handled as the input data terminals of flip-flops (each denoted by "FF" in FIG. 37) of the flip-flop group 91. Further, the input data terminal of the RAM is handled as the input data terminals of flip-flops of the flip-flop group 92. Further, the output data terminal of the RAM is handled as the output data terminals of flip-flops of the flip-flop group 93.

Figure 38:
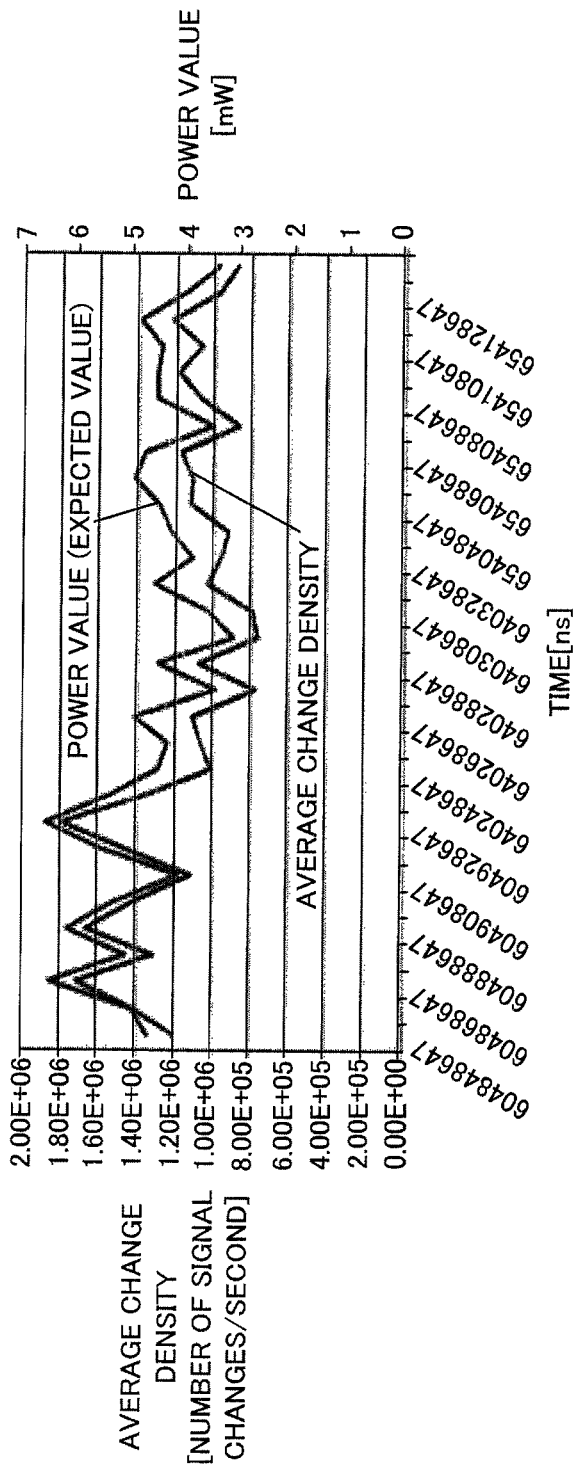
FIG. 38 illustrates an example of calculation of an average change density of signals at input data terminals of flip-flops included in a block 80, and address terminals and input data terminals of RAMs included in the block 80.

The calculation of the average change density of signals at the input data terminals of flip-flops, not illustrated, the address terminals addr and input data terminals data_in of the RAMs, included in the block 80 illustrated in FIG. 30, gives the following result:

FIG. 38 illustrates an example of calculation of the average change density of signals at the input data terminals of flip-flops included in the block 80, and the address terminals and input data terminals of RAMs included in the block 80.

Regarding each RAM in the block 80 as the above-mentioned module, there is illustrated an example of calculation of the average change density of signals at the input data terminals of the flip-flops, the address terminals addr and input data terminals data_in of the RAMs. The address terminal addr of a RAM corresponds to the input data terminals of the flip-flop group 91 in FIG. 37, and the input data terminal data_in of the RAM corresponds to the input data terminals of the flip-flop group 92 in FIG. 37. Further, there is illustrated the expected value of power of the block (result of power estimation using all signal lines in the block).

The horizontal axis represents time [ns], the left vertical axis represents the average change density [the number of signal changes/second], and the right vertical axis represents the power value [mW].

Figure 39:
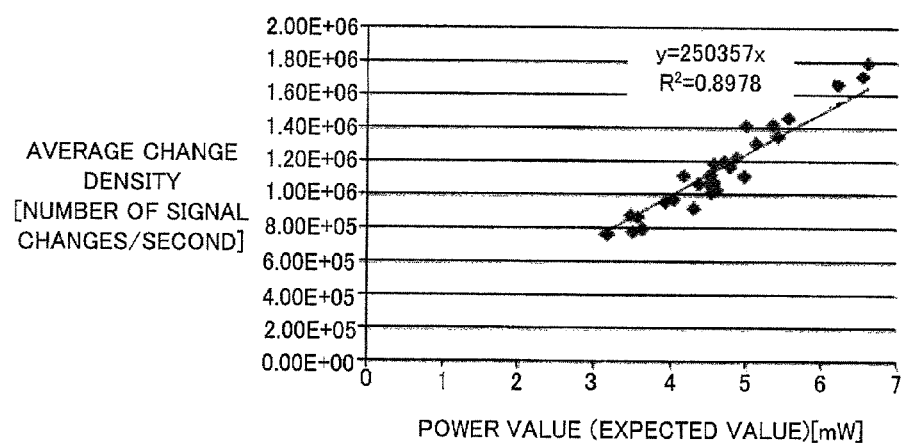
FIG. 39 illustrates an example of a correlation between the average change density of the signals at the input data terminals of the flip-flops, and the address terminals and input data terminals of the RAMs, and the expected value of power.

When a correlation between the expected value of power and the average change density is calculated based on the above-mentioned result, there is obtained the following result:

FIG. 39 illustrates an example of a correlation between the average change density of signals at the input data terminals of the flip-flops, and the address terminals and input data terminals of the RAMs, and the expected value of power.

The horizontal axis represents the expected value of power [mW], and the vertical axis represents the average change density [the number of signal changes/second] of signals at the input data terminals of the flip-flops, and the address terminals and input data terminals of the RAMs. Dots in FIG. 39 each represent a sampling point. A solid straight line represents a linear approximation.

Assuming that the horizontal axis represents x, and the vertical axis represents y, this straight line is expressed by y=250357x. The coefficient of determination $R^2$ calculated using the above-mentioned linear approximation curve drawing function is approximately 0.89. This value is larger than 0.8 used as the reference, and the average change density of signals at the input data terminals of the flip-flops, and the input data terminals and address terminals of the RAMs has an excellent correlation with the expected value of power. From this result, it is considered that it is appropriate to model the RAM as illustrated in FIG. 37.

In view of this, the change density-calculating section 11a performs e.g. the following processing in the step S20 in FIG. 19: For blocks which are determined, based on a ratio of the number of RAMs and that of flip-flops, that they each include a lot of RAMs, the change density-calculating section 11a adds the input data terminals and address terminals of the RAMs to the observing points, in addition to the input data terminals of the flip-flops. Further, the change density-calculating section 11a may add the input data terminals and address terminals of the RAMs to the observing points, in addition to the input data terminals of flip-flops, for a block including a desired RAM.

This makes it possible to accurately estimate power even when there is a block including a RAM, particularly even when there is a block including a lot of RAMs.

Further, as to the block including RAMs as well, it is possible to handle the input data terminals and the address terminals of RAMs as the observing points in the same manner as the input data terminals of the flip-flops, and hence it is not necessary to provide a measurement circuit for measuring signals at the respective terminals of the RAMs separately from a measurement circuit for measuring signals at the terminals of the flip-flops. This makes it possible to prevent an increase in the number of measurement circuits.

Note that the correlation between the average change density of signals at the input data terminals of the flip-flops, and the address terminals and input data terminals of the RAMs, and the expected value of power is slightly lower than the correlation between the average change density of signals at the input data terminals of the flip-flops, and the address terminals, input data terminals, and output data terminals of the RAMs, and the expected value of power.

It is considered that this is because changes in signals at the output data terminals of the flip-flops (flip-flop group 93) connected to the data output line DOUT of the module 90 illustrated in FIG. 37 are not taken into account. We presumed that observing of the input data terminals at the flip-flops has an effect of not only observing the tendency of signal changes at the input data terminals but also observing the tendency of signal changes at the output data terminals. Further, the input data terminals of the flip-flop group 93 in FIG. 37 cannot be observed, and therefore, we presumed that the accuracy can be improved by using the output data terminals data_out of the RAM which corresponds to the output data terminals of the flip-flop group 93, in place of them. Therefore, we carried out an experiment by adding the output data terminals data_out to observing targets. The experimental result will be described hereinbelow.

Figure 40:
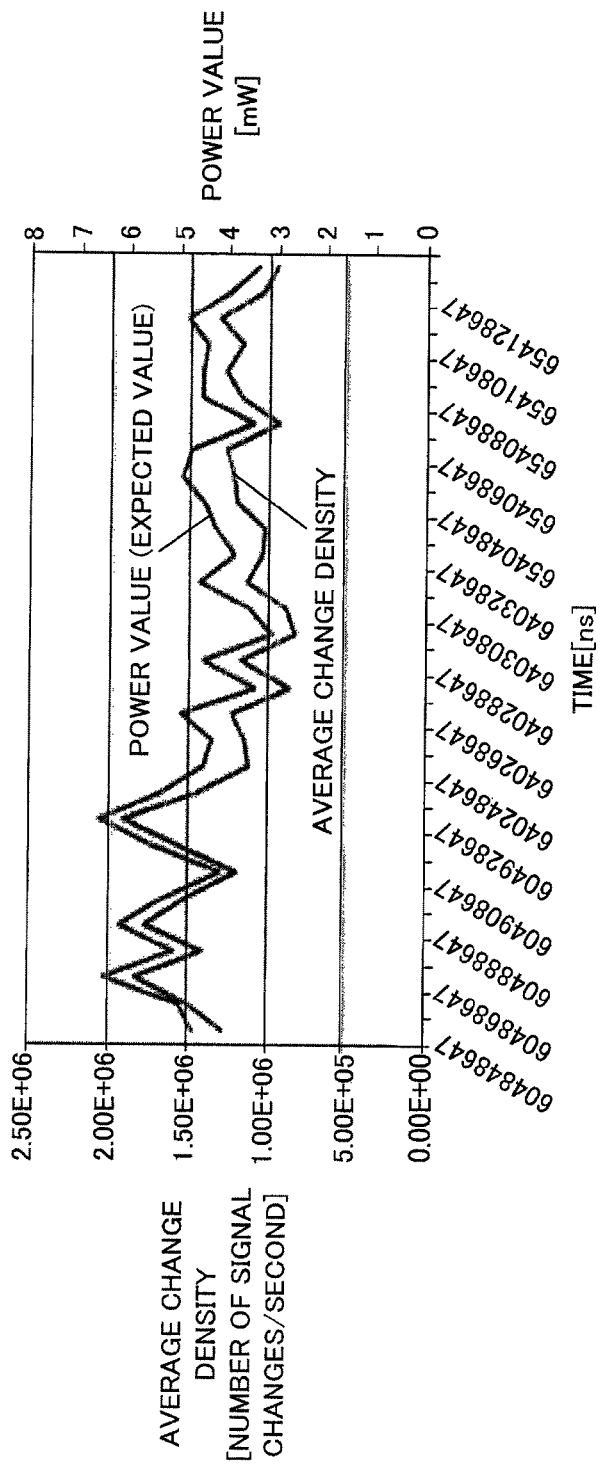
FIG. 40 illustrates an example of calculation of the average change density of signals at the input data terminals of the flip-flops, and the address terminals, input data terminals, and output data terminals of the RAMs included in the block 80.

FIG. 40 illustrates an example of calculation of the average change density of signals at the input data terminals of the flip-flops, and the address terminals, input data terminals, and output data terminal of the RAMs included in the block 80.

An example of calculation of the average change density of signals at the input data terminals of the flip-flops, and the address terminals addr, input data terminals data_in, and output data terminals data_out of RAMs is illustrated. Further, there is illustrated an expected value of power in the block 80.

The horizontal axis represents time [ns], the left vertical axis represents the average change density [the number of signal changes/second], and the right vertical axis represents the power value [mW].

Figure 41:
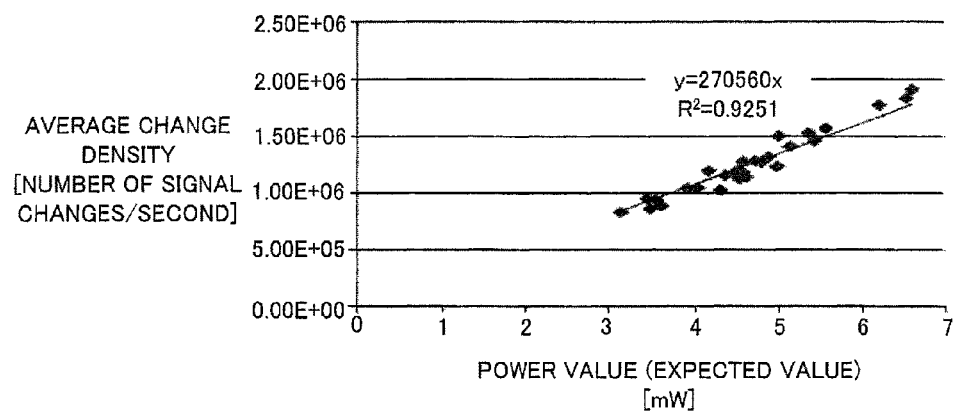
FIG. 41 illustrates an example of a correlation between the average change density of the signals at the input data terminals of the flip-flops, and the address terminals, input data terminals, and output data terminal of the RAMs, and an expected value of power.

The calculation of a correlation between the expected value of power and the average change density based on this example gives the following result:

FIG. 41 illustrates an example of a correlation between the average change density of signals at the input data terminals of flip-flops, and the address terminals, input data terminals, and output data terminals of RAMs, and the expected value of power.

The horizontal axis represents the expected value of power [mW] in the block 80, and the vertical axis represents the average change density [the number of signal changes/second] of signals at the input data terminals of the flip-flops, and the address terminals, input data terminals, and output data terminals of RAMs. Dots in FIG. 41 each represent a sampling point. A solid straight line indicates a linear approximation.

Assuming that the horizontal axis represents x, and the vertical axis represents y, this straight line is expressed by y=270560x. The coefficient of determination $R^2$ calculated using the above-mentioned linear approximation curve drawing function is approximately 0.92. That is, when signals at the output data terminals of the flip-flops connected to the data output line are taken into account, the average change density has an even better correlation with the expected value of power. From this result, it is considered that an idea of adding the output data terminals data_out of the RAMs corresponding to the output data terminals of the flip-flop group 93 to the observing points in place of the input data terminals of the flip-flop group 93 in FIG. 37 is effective.

Therefore, the change density-calculating section 11a adds the address terminals, input data terminals, and output data terminals of the RAMs to the observing points, in addition to the input data terminals of the flip-flop.

This makes it possible to accurately estimate power even when there is a block including a RAM or RAMs, particularly even when there is a block includes a lot of RAMs.

Further, thanks to the model illustrated in FIG. 37 and the idea of regarding the output data terminals of RAMs as a substitute for the input data terminals, it is possible to handle the address terminals, input data terminals, and output data terminals of RAMs as the observing points, in the same manner as the input data terminals of the flip-flops. This makes it unnecessary to provide a measurement circuit for measuring the signals at the respective terminals of the RAM separately from a measurement circuit for measuring the signals at the terminals of the flip-flops, and hence it is possible to prevent an increase in the number of measurement circuits.

As described above, it is shown by experiment that it is valid to performing modeling as illustrated in FIG. 37, and it is valid to observe the output data terminals of the flip-flop groups as a substitute for the input data terminals of the same. Therefore, the terminals of the RAM can be handled in the same manner as the input data terminals of the flip-flops.

The signals at the address terminals, input data terminals, and output data terminals of the RAMs frequently vary, and therefore, the observing points are set by taking into account these terminals as described above, whereby it is possible to more accurately estimate power.

Note that although in the above description, the address terminals, input data terminals, and output data terminals of RAMs are observed, by way of example, it can be easily imagined that data mask terminals can also be similarly handled.

(Example of Hardware of Power Estimator)

Figure 42:
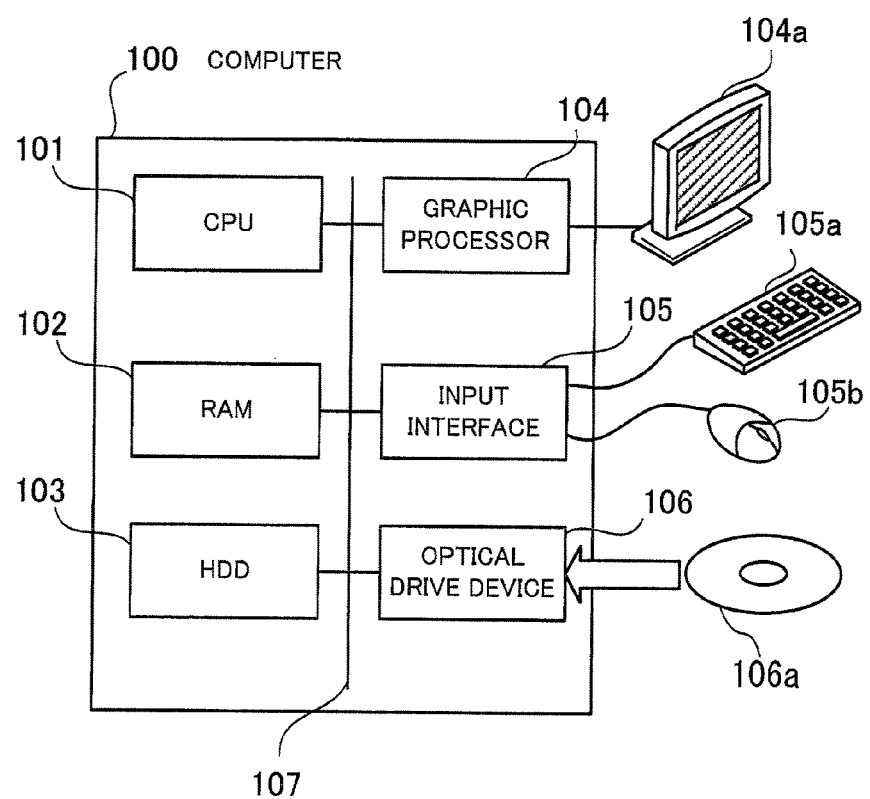
FIG. 42 illustrates an example of hardware of the power estimator.

FIG. 42 illustrates an example of hardware of the power estimator.

The power estimator 1 or 10 illustrated in FIG. 1 or 3 is realized e.g. by a computer 100 illustrated in FIG. 42. The computer 100 in its entirety is controlled by a CPU (central processing unit) 101. A RAM (random access memory) 102 and a plurality of peripheral devices are connected to the CPU 101 via a bus 107. The CPU 101 realizes functions of the power calculation processor 11, the power estimating section 12, the emulator controller 13, and so forth illustrated in FIG. 3, in cooperation with the sections connected to the bus 107.

The RAM 102 is used as a main storage device of the computer 100. The RAM 102 temporarily stores at least part of a program of an OS (operating system) and application programs which the CPU 101 is caused to execute. Further, the RAM 102 stores various items of data required by the CPU 101 for processing.

The peripheral devices connected to the bus 107 include a hard disk drive (HDD) 103, a graphic processor 104, an input interface 105, an optical drive device 106, and so forth.

The HDD 103 magnetically writes and reads data in and from an incorporated disk. The HDD 103 is used as a secondary storage device of the computer 100. The HDD 103 stores the program of the OS, the application programs, and various items of data. The HDD 103 has e.g. the function of the storage device 15 illustrated in FIG. 3. Note that a semiconductor storage device such as a flash memory can be used as a secondary storage device.

A monitor 104a is connected to the graphic processor 104. The graphic processor 104 displays the result of power estimation as illustrated in FIGS. 17 and 18 on a screen of the observe 104a according to commands from the CPU 101. The monitor 104a may be a display device using a CRT (cathode ray tube) or a liquid crystal display device, for example.

A keyboard 105a and a mouse 105b are connected to the input interface 105. The input interface 105 transmits signals delivered from the keyboard 105a or the mouse 105b to the CPU 101. The mouse 105b is an example of a pointing device, and any other suitable type of pointing device can be used. The other suitable types of the pointing device include a touch panel, a tablet, a touch pad, a track ball, and so forth.

The optical drive device 106 reads data recorded in an optical disk 106a using e.g. a laser light. The optical disk 106a is a portable record medium in which data is recorded in a manner readable by reflection of light. Examples of the optical disk 106a include a DVD (digital versatile disc), a DVD-RAM, a CD-ROM (compact disc read only memory), a CD-R (recordable)/RW (rewritable).

Note that it is possible to realize the above-described function of processing by a computer. In this case, a program in which content of processing of function to be included in the power estimators 1 and 10 is written is provided. By carrying out the program by the computer, the above-described function of processing is realized on the computer. The program in which the content of processing is written can be recorded in a record medium which is capable of being read by the computer. Examples of the record medium which is capable of being read by the computer include a magnetic recording system, an optical disk, a magnetooptical medium, a semiconductor memory or the like. Examples of the magnetic recording system include an HDD, a flexible disk (FD), a magnetic tape. Examples of the optical disk include a DVD, a DVD-RAM, a CD-ROM/RW. Examples of the magnetooptical medium include an MO (magneto-optical disc).

In case of distributing programs, for example, portable record mediums, such as DVD, CD-ROM or the like in which the program is recorded are marketed. Further, it is also possible to store the program in a storing device of a server computer, and transfer the program from the server computer to the other computer via a network.

The computer which carries out the program stores, for example, the program which is recorded in the portable record medium, or is transferred from the server computer in the storing device thereof. Then, the computer reads out the program from the storing device thereof, and carries out the processes according to the program. Note that the computer is also capable of directly reading out the program from the portable record medium, and carrying out the processes according to the program. Further, the computer is also capable of carrying out the processes according to the program which is received, each time the program is transferred from the server computer connected via a network.

Further, at least part of the above-described function of processing can be realized by an electronic circuit, such as a DSP (digital signal processor), an ASIC (application specific integrated circuit), a PLD (programmable logic device) or the like.

According to the disclosed power estimator and method, it is possible to accurately analyze power for a long time period for a large-scale circuit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A computer, comprising a power estimator, wherein the power estimator comprises:
    a power coefficient-calculating unit configured to calculate a power coefficient which indicates a first power value in each of a plurality of circuit ranges which do not include a clock tree when a first average value of a number of signal changes per unit time is a first value or equal to 1; and
    a power value-calculating unit configured to calculate a second power value for each of the plurality of circuit ranges based on the power coefficient and a second average value of the number of signal changes per unit time at observing points which are fewer than signal lines included in each of the plurality of circuit ranges.

2. The computer according to claim 1, wherein the power estimator further comprises a calculating unit configured to calculate the second average value in each of the plurality of circuit ranges, for each predetermined time period,
    wherein said power value-calculating unit calculates the second power value for each predetermined time period based on the second average value in each of the plurality of circuit ranges for each predetermined time period.

3. The computer according to claim 2, wherein said calculation unit changes a length of the unit time according to an operating condition of simulation.

4. The computer power estimator according to claim 1, wherein the power estimator further comprises a correction coefficient-calculating unit configured to calculate a ratio of a third average value of the number of signal changes per unit time at the signal lines to the second average value, as a correction coefficient,
    wherein said power value-calculating unit calculates the second power value based on the correction coefficient.

5. The computer according to claim 4, wherein said correction coefficient-calculating unit calculates the correction coefficient from waveform data acquired by simulation which is shorter in time than a time period for power estimation.

6. The computer according to claim 4, wherein said power value-calculating unit calculates the second power value based on the correction coefficient stored in a storage medium, which was calculated in the past.

7. The computer according to claim 1, wherein the plurality of circuit ranges includes a combinational circuit, and the observing points are data terminals of flip-flops.

8. The computer according to claim 1, wherein the plurality of circuit ranges includes one or a plurality of RAMs, and the observing points are an address terminal, an input data terminal, or an output data terminal of each of the one or the plurality of RAMs.

9. The computer according to claim 1, wherein a logic area between an address terminal, an input data terminal, or an output data terminal of a RAM and a flip-flop nearest to the address terminal, the input data terminal, or the output data terminal is set as a different circuit range included in the plurality of circuit ranges from other circuit ranges included in the plurality of circuit ranges, and in a circuit range included in the plurality of circuit ranges, including the logic area, the address terminal, the input data terminal, or the output data terminal is designated as the observing point.

10. The computer according to claim 1, wherein in the plurality of circuit ranges, an address terminal, an input data terminal, or an output data terminal of a RAM is handled as an input data terminal or an output data terminal of a flip-flop, and is set as the observing point.

11. The computer according to claim 1, wherein said power coefficient-calculating unit calculates the power coefficient using data with which layout design is underway.

12. A method of estimating power, executed by a computer, comprising:
    calculating a power coefficient which indicates a first power value in each of a plurality of circuit ranges which do not include a clock tree when a first average value of a number of signal changes per unit time is a first value or equal to 1; and
    calculating a second power value for each of the plurality of circuit ranges based on the power coefficient calculated and a second average value of the number of signal changes per unit time at observing points which are fewer than signal lines included in each of the plurality of circuit ranges.

13. A non-transitory computer-readable medium storing a program for causing a computer to execute a process comprising:
    calculating a power coefficient which indicates a first power value in each of a plurality of circuit ranges which do not include a clock tree when a first average value of a number of signal changes per unit time is a first value or equal to 1; and
    calculating a second power value for each of the plurality of circuit ranges based on the power coefficient calculated and a second average value of the number of signal changes per unit time at observing points which are fewer than signal lines included in each of the plurality of circuit ranges.

* * * * *